US012006223B2

(12) United States Patent
Gupta et al.

(10) Patent No.: US 12,006,223 B2
(45) Date of Patent: Jun. 11, 2024

(54) ACTIVATED CARBON ELECTRODE MATERIAL

(71) Applicants: Pittsburg State University, Pittsburg, KS (US); Missouri Soybean Merchandising Council, Jefferson City, MO (US)

(72) Inventors: Ram Gupta, Pittsburg, KS (US); Pawan Kahol, Carl Junction, MO (US)

(73) Assignees: Pittsburg State University, Pittsburg, KS (US); Missouri Soybean Merchandising Council, Jefferson City, MO (US)

( * ) Notice: Subject to any disclaimer, the term of this patent is extended or adjusted under 35 U.S.C. 154(b) by 602 days.

(21) Appl. No.: 17/293,224

(22) PCT Filed: Nov. 12, 2019

(86) PCT No.: PCT/US2019/060833
§ 371 (c)(1),
(2) Date: May 12, 2021

(87) PCT Pub. No.: WO2020/102136
PCT Pub. Date: May 22, 2020

(65) Prior Publication Data
US 2022/0306477 A1     Sep. 29, 2022

Related U.S. Application Data

(60) Provisional application No. 62/760,730, filed on Nov. 13, 2018.

(51) Int. Cl.
*C01B 32/318* (2017.01)
*C01B 32/348* (2017.01)

(52) U.S. Cl.
CPC .......... *C01B 32/318* (2017.08); *C01B 32/348* (2017.08); *C01P 2002/82* (2013.01);
(Continued)

(58) Field of Classification Search
CPC ..... C01B 32/318; C01B 32/348; C01B 32/30; C01P 2002/82; C01P 2002/85;
(Continued)

(56) References Cited

U.S. PATENT DOCUMENTS

2005/0181941 A1   8/2005   Sugo et al.
2011/0245071 A1   10/2011  Tanabe
(Continued)

FOREIGN PATENT DOCUMENTS

CN   103922305 A   7/2014
CN   105122519 A   12/2015
(Continued)

OTHER PUBLICATIONS

"Mesoporous material," accessed online at https://en.wikipedia.org/wiki/Mesoporous_material on Apr. 22, 2024 (Year: 2024).*
(Continued)

*Primary Examiner* — Daniel C. McCracken
(74) *Attorney, Agent, or Firm* — Thompson Coburn LLP; Steven M. Ritchey

(57) ABSTRACT

An activated carbon powder comprising activated carbon particles that comprise D-band carbon corresponding to a $sp^3$ hybridized disordered carbon phase and G-band carbon corresponding to a $sp^2$ hybridized graphitic phase at a controlled proportion. Additionally, the activated carbon particles comprise nitrogen at an amount that is in a range of about 0.3 atomic % to about 1.8 atomic % of the activated carbon particles, wherein at least some of the nitrogen atoms are substituted for carbon atoms in the crystal lattice structure of the G-band carbon. Also, the carbon particles have a surface area that is in a range of about 900 $m^2/g$ to about 2,500 $m^2/g$, an average pore width in a range of about 1 nm to about 4 nm, a microporous surface area in a range of about 300 $m^2/g$ to about 1,350 $m^2/g$, and a cumulative surface area of pores with a hydraulic radius in a range of 0.285 nm to 1.30 nm that is in a range of about 1,000 $m^2/g$ to about 3,000 $m^2/g$.

18 Claims, 21 Drawing Sheets

(52) U.S. Cl.
CPC ...... *C01P 2002/85* (2013.01); *C01P 2006/12* (2013.01); *C01P 2006/16* (2013.01); *C01P 2006/40* (2013.01)

(58) Field of Classification Search
CPC .............. C01P 2006/12; C01P 2006/16; C01P 2006/40; Y02E 60/13; H01M 4/587; H01M 4/583; B01F 27/00; H01G 11/34; H01G 11/84
See application file for complete search history.

(56) References Cited

U.S. PATENT DOCUMENTS

| | | | |
|---|---|---|---|
| 2014/0107371 A1* | 4/2014 | Bakker | ................. B01J 23/755 558/414 |
| 2014/0291587 A1* | 10/2014 | Li | .......................... H01G 11/34 252/502 |
| 2015/0357637 A1 | 12/2015 | Yamanoi et al. | |
| 2016/0240851 A1 | 8/2016 | Zhang | |

FOREIGN PATENT DOCUMENTS

| | | |
|---|---|---|
| EP | 1498389 A1 | 1/2005 |
| JP | 2010135647 A | 6/2010 |
| JP | 2012512129 A | 5/2012 |
| JP | 2017147338 A | 8/2017 |
| WO | 2017045573 A1 | 3/2017 |

OTHER PUBLICATIONS

Rouquerol, et al., Recommendations for the Characterizations of Porous Solids, Pure & Appl. Chem. 1994; 66(8): 1739-1758 (Year: 1994).*

Hu, et al., Preparation of Mesoporous High-Surface-Area Activated Carbon, Adv. Mater. 2000; 12(1): 62-65 (Year: 2000).*

* cited by examiner

ACTIVATED CARBON ELECTRODE MATERIAL

CROSS-REFERENCE TO RELATED APPLICATIONS

This application claims priority to U.S. Prov. Pat. App. No. 62/760,730, filed Nov. 13, 2018, which is incorporated herein by reference in its entirety.

FIELD OF THE INVENTION

The present invention is directed to electrode materials for energy storage devices. More particularly, the present invention is directed to activated carbon material for use as electrode material in energy storage devices such as batteries and supercapacitors.

SUMMARY OF INVENTION

One embodiment of the invention is directed to an activated carbon powder comprising activated carbon particles, wherein the activated carbon particles have a Brunauer-Emmett-Teller (BET) surface area that is in a range of about 900 $m^2/g$ to about 2,500 $m^2/g$. The wherein the activated carbon particles comprise:
  (a) carbon that comprises:
    (i) D-band carbon corresponding to a $sp^3$ hybridized disordered carbon phase; and
    (ii) G-band carbon corresponding to a $sp^2$ hybridized graphitic phase; wherein the D-band carbon and G-band carbon are at a proportion, determined using Raman spectroscopy to arrive at relative intensities of D-band carbon ($I_D$) and G-band carbon ($I_G$), such that a $I_G/I_D$ ratio is in a range of 0 to about 2;
  (b) nitrogen at an amount, determined by X-ray photoelectron spectroscopy, that is in a range of about 0.3 atomic % to about 1.8 atomic % of the activated carbon particles, wherein at least some of the nitrogen atoms are substituted for carbon atoms in the crystal lattice structure of the G-band carbon $sp^2$ hybridized graphitic phase;
  (c) mesopores with diameters in a range of 2 nm to 5 nm and micropores with diameters less than 2 nm, the activated carbon particles having:
    (i) an average pore width, determined by the Barrett, Joyner, and Halenda (BJH) method, in a range of about 1 nm to about 4 nm;
    (ii) a microporous surface area, determined by the t-plot method, in a range of about 300 $m^2/g$ to about 1,350 $m^2/g$; and
    (ii) a cumulative surface area of micropores with a hydraulic radius in a range of 0.285 nm to 1.30 nm that is in a range of about 1,000 $m^2/g$ to about 3,000 $m^2/g$.

One embodiment of the invention is directed to a process for producing the aforementioned activated carbon particles of the activated carbon powder. The process comprising:
  conducting an activation-pyrolyzation treatment of a precursor that comprises a uncarbonized plant material powder, partially carbonized plant material powder, or a combination thereof, wherein the activation-pyrolyzation treatment comprises:
    mixing the precursor with an activating agent to form a precursor-activating agent mixture, wherein the activating agent is selected to react with carbon in the precursor during the activation-pyrolyzation treatment thereby forming one or more products that are suitable to be removed during a washing treatment conducted after the activation-pyrolyzation treatment; and combinations thereof; and
    heating the precursor-activating agent mixture in a pyrolyzation inert atmosphere at a pyrolyzation temperature and for a pyrolyzation duration sufficient to complete the carbonization of the precursor thereby forming an activated-pyrolyzed material; and
  conducting a washing treatment of the activated-pyrolyzed material with one or more washing liquids suitable to reduce or remove the one or more products of the reaction between carbon and the activating agent from the activated-pyrolyzed material thereby forming the activated carbon particles of the activated carbon powder.

One embodiment of the invention is directed to an electrode comprising the aforementioned activated carbon powder.

One embodiment of the invention is directed to a battery comprising the above-described electrode.

One embodiment of the invention is directed to a supercapacitor comprising the above described electrode.

DETAILED DESCRIPTION OF INVENTION

Figure 1:
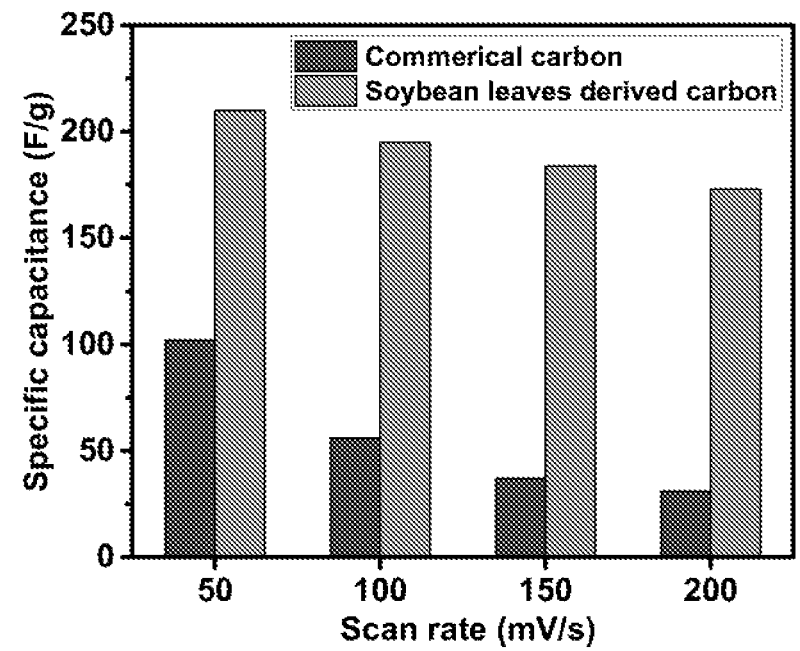
FIG. 1 contains charts showing specific capacity as a function of scan rate and current density of commercially-available carbon and an activated carbon embodiment of the present invention.
Figure 1:
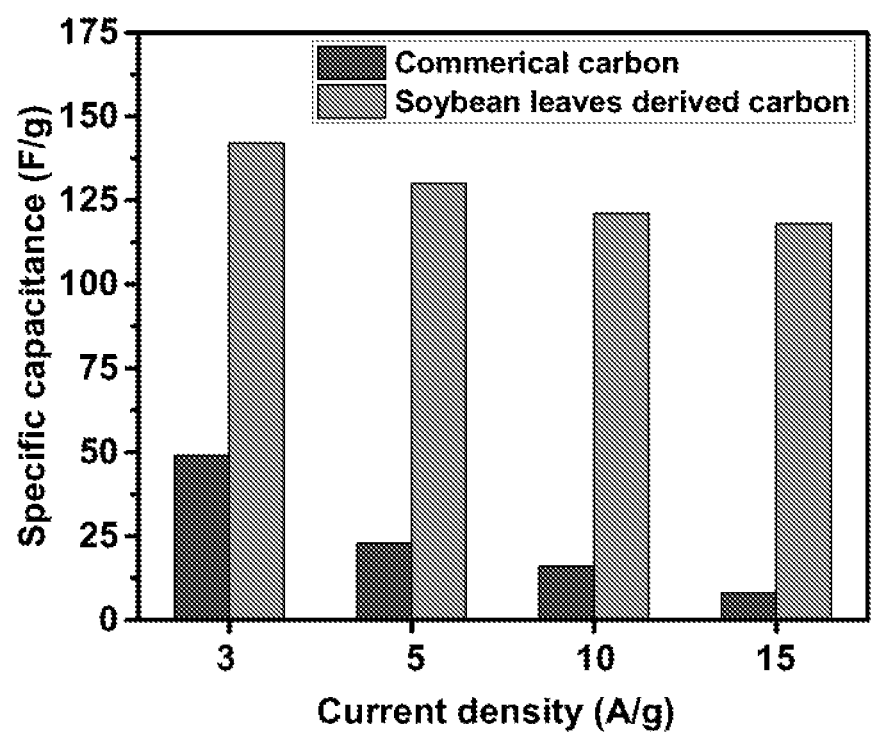

I. Activated Carbon Powder Comprising Activated Carbon Particles

As indicated above, one embodiment of the present invention is directed to an activated carbon powder comprising activated carbon particles. Importantly, the activated particles of the present invention are derived from plant-based materials that are typically considered waste. As will be discussed in greater detail below, it is believed that the composition of the starting materials along with the processing of said materials yields activated carbon particles with desirable properties compared to that of commercial carbon particles. For example, it has been observed that one embodiment of the activated carbon particles of the present invention exhibited an energy storage capacity approximately 7.5 times that of commercial carbon electrode material and a stable rate capability due to the activated carbon of said embodiment maintaining about 83% of its initial storage capacity on increasing discharge current density from 3 A/g to 15 A/g, whereas commercial carbon particles only maintained about 16% of its initial storage capacity under similar condition.

II. Method of Making the Activated Carbon Particles

A. Plant-Based Materials

As mentioned, the activated carbon particles of the present invention are derived from plant-based materials. Essentially any suitable plant-based material may be used but for economic and environmental reasons it is typically desirable to utilize plant material or biomass that is considered to be waste. For example, suitable biomass includes non-grain soybean plant parts (e.g., leaves, shells, and stems), soybean grain, citrus fruit peels (e.g., orange, lemon, lime, etc.), banana peels, tea leaves, corn stover, corn grain, corn grain distiller, coconut husk, and combinations thereof. In one embodiment, the plant-based material/biomass is non-grain soybean plant parts selected from the group consisting of shells, stems, leaves, and combinations thereof. Although much of this disclosure and the examples set forth herein are directed to such soybean plant material embodiments, this should not be interpreted as limiting, unless expressly indicated. Instead, unless expressly indicated, the teachings herein apply equally to other types of plant-based material.

Typically, the plant-based material has been subjected to mechanical operations such as cutting, chopping, pulverizing, grinding, etc., possibly rinsing, and drying such that plant-based material is a dry powder or particulate.

Without being held to a particular theory, it is believed that the composition of these plant-based materials plays a role in the unique and desirable properties of the activated carbon particles of the present invention. Without being held to a particular theory, it is believed that the proteins within the materials result in the activated carbon particles comprising nitrogen atoms at least some of which at least some of which are substituted for carbon atoms in the crystal lattice structure of a graphite phase or G-band carbon $sp^2$ hybridized graphitic phase, which is electrically conductive.

B. Thermal Pretreatment

The process for producing the activated carbon particles of the activated carbon powder may comprise an optional thermal pretreatment of a plant material powder that comprises particles of clean and dry plant material. The thermal pretreatment comprises heating the plant material powder in a pretreatment inert atmosphere at a pretreatment temperature and for a pretreatment duration sufficient to release volatile, low-stability molecules within the plant material powder thereby producing a partially carbonized plant material powder that is suitable for the activation-pyrolyzation treatment described below.

In one embodiment, the pretreatment inert atmosphere is selected from the group consisting of nitrogen, argon, and combinations thereof; the pretreatment temperature is in a range of about 250° C. to about 500° C., and the pretreatment duration is in a range of about 1 hour to about 2 hours.

In another embodiment, the pretreatment inert atmosphere is selected from the group consisting of nitrogen, argon, and combinations thereof; the pretreatment temperature is in a range of about 300° C. to about 400° C., and the pretreatment duration is in a range of about 1 hour to about 2 hours.

Figure 18:
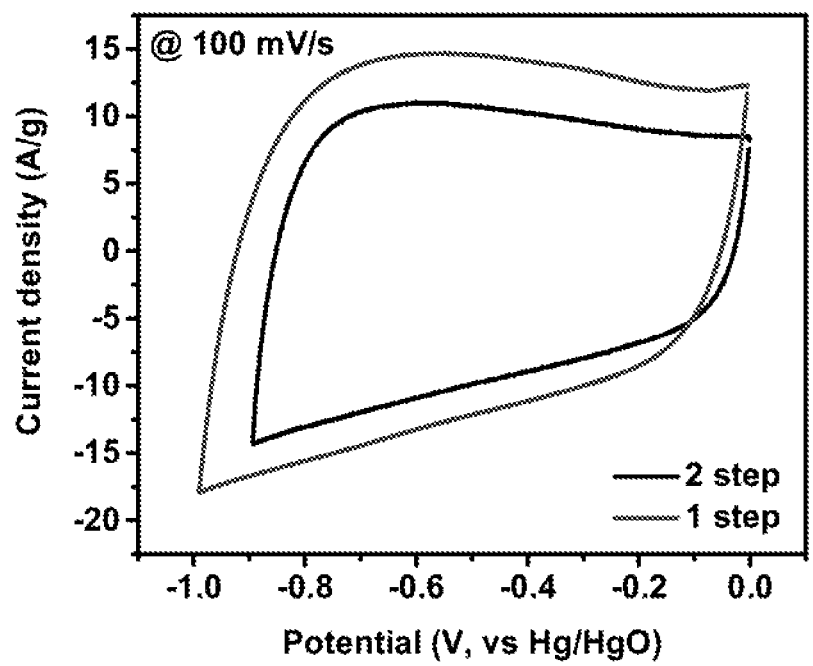
FIG. 18 is a graph comparing the CV curves at 100 mV/s of activated carbon prepared using a 2-step process and prepared using a 1-step process from soybean stem and activated using a 1:0.5 weight ratio.
Figure 19:
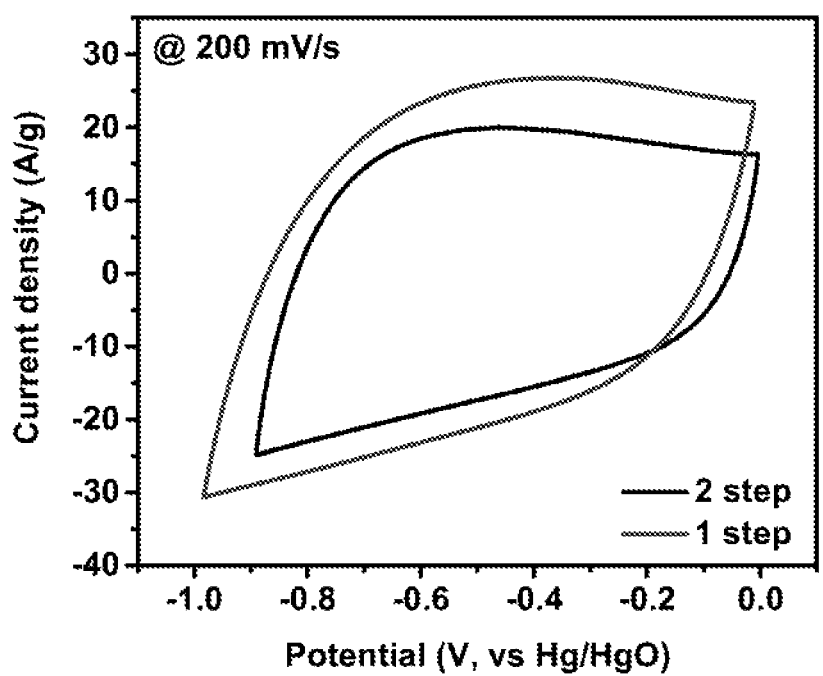
FIG. 19 is a graph comparing the CV curves at 200 mV/s for activated carbon prepared using a 2-step process and prepared using a 1-step process from soybean stem and activated using a 1:0.5 weight ratio.
Figure 20:
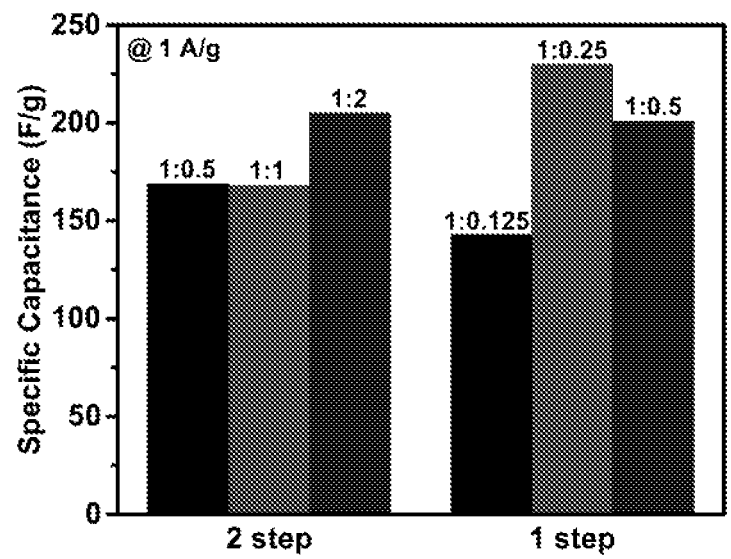
FIG. 20 is a graph comparing the charge storage capacity at 1 A/g for activated carbon prepared using a 2-step process versus that prepared using a 1-step process from soybean stem, wherein the indicated ratio above each column is the ratio of pre-activated carbon to activating agent for a 2-step process and the ratio of soybean stem to activating agent for a 1-step process.
Figure 21:
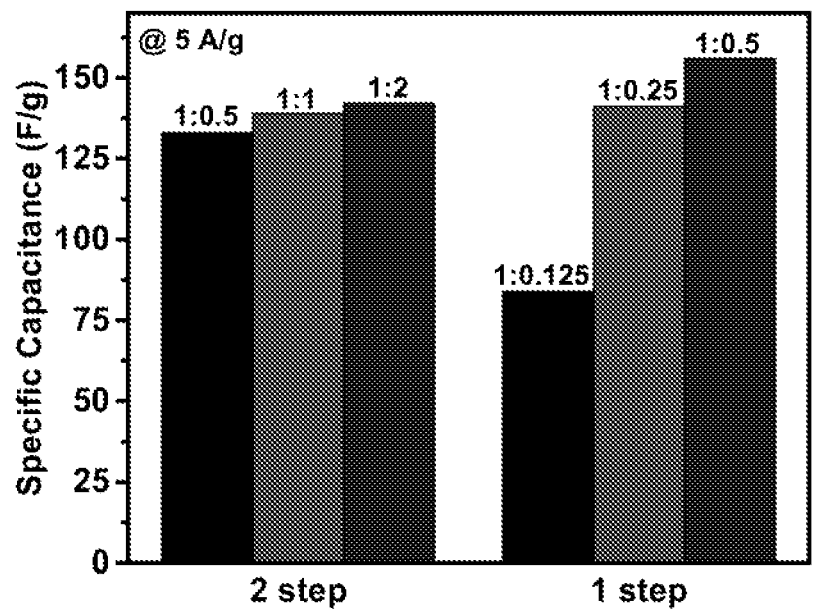
FIG. 21 is a graph comparing the charge storage capacity at 5 A/g for activated carbon prepared using a 2-step process versus that prepared using a 1-step process from soybean stem, wherein the indicated ratio above each column is the ratio of pre-activated carbon to activating agent for a 2-step process and the ratio of soybean stem to activating agent for a 1-step process.

If a thermal pretreatment is conducted, such a process may be referred to herein as a "2-step" or "two-step" process. If a thermal pretreatment is not conducted, such a process may be referred to herein as a "1-step" or "one-step" process. Surprisingly, not conducting the optional thermal pretreatment significantly reduces the processing duration and cost without a significant decrease to the charge storage capacity of the resulting material. In fact, some results to date have shown that the one-step process may actually increase the charge storage capacity. For example, the current-voltage characteristics of 2-step and 1-step carbons shown in FIGS. 18 and 19 are similar. On the other hand, the large area under the CV curves for the 1-step carbon compared to the 2-step carbon shown in FIGS. 18 and 19 suggest that the 1-step carbon had improved charge storage capacity. Unless expressly noted, the properties of activated carbon powder set forth herein apply to powder prepared by either the 1-step process or the 2-step process.

C. Activation-Pyrolyzation Treatment

The method comprises subjecting the precursor material that which comprises uncarbonized plant material powder, partially carbonized plant material powder (which may have been subjected to the above-described thermal pretreatment), or a combination thereof to an activation-pyrolyzation treatment that carbonizes the precursor material the precursor material and contributes to a high surface area, a modified meso- and micro-porosity, a modified composition, and modified crystallographic structure. To avoid any confusion, in the case of partially carbonized plant material powder, the activation-pyrolyzation treatment continues the carbonization of the partially carbonized plant material powder.

1. Mixing the Precursor with an Activating Agent

The activation-pyrolyzation treatment comprises mixing the precursor with an activating agent to form a precursor-activating agent mixture. The activating agent is selected to react with carbon in the precursor during the activation-pyrolyzation treatment thereby forming one or more products that are suitable to be removed during a washing treatment conducted after the activation-pyrolyzation treatment. In one embodiment, the activating agent is selected from the group consisting of KOH, NaOH, $ZnCl_2$, $H_3PO_4$, steam, and combinations thereof. In another embodiment, the activating agent is KOH.

Important factors in controlling one or more of the properties of the resulting activated carbon particles are the selection of the activating agent and the relative amounts activating agent and precursor in the mixture. It has been observed that KOH tends to be the most reactive or efficient of the aforementioned activating agents. Additionally, it has been observed that increasing the amount of activating agent relative to the precursor tends to increase the surface area of the resulting activated carbon particles.

It has also been observed that relative amounts of mesopores (i.e., pores with diameters in a range of 2 nm to 4 nm) and micropores (i.e., pores with diameters less than 2 nm) within the activated carbon particles are affected by the amount of activating agent relative to the precursor. Specifically, it has been observed that the average pore diameter tends to decrease as the relative amount of the activating agent is increased. This observation, upon initial consideration, seems to be counterintuitive because one would expect pore diameter to increase with increasing amounts of activating agent. Without being bound to a particular theory, it is believed that the decrease in average pore diameter may be the result pores collapsing upon reaching a sufficiently large size.

Additionally, it has been observed that the nitrogen content of the activated carbon particles (which is addressed in more detail below) tends to decrease as the relative amount of the activating agent is increased.

Further still, it has been observed that uniformity of the crystallographic structure of the activated carbon particles (which is addressed in more detail below) tends to decrease as the relative amount of activating agent is increased. Without being held to a particular theory, it is believed that as nitrogen atoms (substituted for carbon atoms within the graphite phase of the carbon or G-band carbon in the activated carbon particles, which may be referred to as "graphitic nitrogen") are lost as part of the activation process, the crystallographic structure of the graphite phase or G-band carbon loses uniformity and, as a result, the activated carbon tends to contain less G-band carbon relative to diamond phase or D-band carbon as the relative amount of activating agent is increased.

In one embodiment, the precursor and non-steam activating agent are at a mass ratio that is in a range of about 1:0.5 to about 1:3.

In another embodiment, the precursor and non-steam activating agent are at a mass ratio in a range of about 1:1 to 1:2.

In another embodiment, the precursor and non-steam activating agent are at a mass ration that is in a range of about 1:0.125 to about 1:1.

2. Pyrolyzation of the Precursor-Activating Agent Mixture

The activation-pyrolyzation treatment further comprises heating the precursor-activating agent mixture in a pyrolyzation inert atmosphere at a pyrolyzation temperature and for a pyrolyzation duration sufficient to complete the carbonization of the precursor thereby forming an activated-pyrolyzed material.

In one embodiment, the pyrolyzation atmosphere is selected from the group consisting of nitrogen, argon, and combinations thereof; the pyrolization temperature is in a range of about 600° C. to about 900° C., and the pyrolization duration is in a range of about 1 hour to about 2 hours.

In another embodiment, the pyrolyzation atmosphere is selected from the group consisting of nitrogen, argon, and combinations thereof; the pyrolyzation temperature is in a range of about 700° C. to about 850° C., and the pyrolyzation duration is in a range of about 1 hour to about 2 hours.

D. Washing Treatment

The method further comprises subjecting the activated-pyrolyzed material to a washing treatment. The washing treatment comprises contacting the activated-pyrolyzed material with one or more washing liquids suitable to reduce or remove the one or more products of the reaction between carbon and the activating agent from the activated-pyrolyzed material thereby forming the activated carbon particles of the activated carbon powder.

In one embodiment, the at least one of the washing liquids of the washing treatment is a solution comprising a dissolved compound selected from the group consisting of HCl, DI water, and combinations thereof.

In another embodiment the at least one of the washing liquids of the washing treatment a solution comprising HCl solution and deionized water and wherein a subsequent washing liquid is deionized water.

E. Drying

The process may further comprise drying the activated carbon particles. Also, if the activated carbon particles have agglomerated, they may be subjected to a physical operation (e.g., grinding) to better separate them.

III. Activated Carbon Particles

A. High Surface Area

As mentioned above, the activated carbon particles of the present invention have certain properties that make them well suited for electrical energy storage applications such as electrodes for batteries and supercapacitors. One such property is a relatively high surface area. For example, in one embodiment, the activated carbon particles have a Brunauer-Emmett-Teller (BET) surface area that is in a range of about 1,100 m$^2$/g to about 2,100 m$^2$/g. In another embodiment, the BET surface area of the activated carbon particles is in a range of about 900 m$^2$/g to about 2,500 m$^2$/g. In still another embodiment, the BET surface area of the activated carbon particles is in a range of about 1,300 m$^2$/g to about 2,100 m$^2$/g.

As noted above, the degree of surface area may be controlled, in large part, by the selection of the activating agent and the relative amount of carbon precursor to the material. Specifically, selecting more effective activating agents and/or more activating agent relative to precursor tends to produce higher surface areas.

B. Carbon Comprising D-Band and G-Band Material

The activated carbon particles comprise carbon and that carbon has different crystallographic structures. Specifically, the carbon comprises D-band carbon corresponding to a sp$^3$ hybridized disordered carbon phase and G-band carbon corresponding to a sp$^2$ hybridized graphitic phase.

In one embodiment, the D-band carbon and G-band carbon are at a proportion, determined using Raman spectroscopy to arrive at relative intensities of D-band carbon ($I_D$) and G-band carbon ($I_G$), such that a $I_G/I_D$ ratio is in a range of 0 to about 2.

In another embodiment, the $I_G/I_D$ ratio is in a range of about 0 to about 1.7.

In yet another embodiment, the $I_G/I_D$ ratio is in a range of about 0 to about 1.5.

The presence of G-phase is expected to improve the charge storage capacity of the activated carbons because of its higher conductivity than that of D-phased carbon.

C. Nitrogen

As described above, the activated carbon particles also comprise nitrogen. It is believed that at least some of the nitrogen atoms are substituted for carbon atoms in the crystal lattice structure of the G-band carbon sp$^2$ hybridized graphitic phase. Also as mentioned above, the nitrogen content of the activated carbon particles may be controlled or selected via the activation-pyrolyzation treatment. In particular, it has been observed that the mass ratio of precursor and activating agent play a substantial role in the nitrogen content. Without being bound to a particular theory, it is believed that nitrogen may be leached out of or removed from the activated carbon via the pores that are formed as part of the activation reaction between the activating agent and precursor.

It has been observed that desirable performance of the activated carbon particles in electrodes of electrical storage applications such as batteries and supercapacitors is achieved by controlling the nitrogen content of the activated carbon particles that the nitrogen is at an amount, determined by X-ray photoelectron spectroscopy, that is in a range of about 0.5 atomic % to about 1.7 atomic % of the activated carbon particles.

In another embodiment, the amount of nitrogen is in a range of about 0.4 atomic % to about 1.8 atomic % of the activated carbon particles.

In yet another embodiment, the amount of nitrogen is in a range of about 0.5 atomic % to about 1.1 atomic % of the activated carbon particles.

D. Pores

As described above, the activated carbon particles also comprise mesopores with diameters in a range of 2 nm to 4 nm and micropores with diameters less than 2 nm. The porosity of the activated carbon particles of the present invention may be characterized in a variety of ways (see, e.g., Table A below) in addition to the surface area that is in a range of about 1,000 m$^2$/g to about 2,500 m$^2$/g.

1. Average Pore Width

For example, the activated carbon particles may be characterized in terms of the average pore width, which is a measure of the relative amount of mesopores and micropores. In one embodiment, the adsorption average pore width, determined by the Barrett, Joyner, and Halenda (BJH) method, is in a range of about 1 nm to about 4 nm. In another embodiment, the average pore width is in a range of about 1 nm to about 2 nm. In yet another embodiment the average pore width is in a range of about 2 nm to about 4 nm.

The ability to tune pore size allows the use of a wide range of electrolytes. An appropriate sized pore will allow easy access of the electrolyte ions into pores of these carbons.

2. Microporous Surface Area

The activated carbon particles of the present invention may also be characterized in terms of the microporous surface area. For example, in one embodiment, the microporous surface area, determined by the t-plot method, is in a range of about 300 m$^2$/g to about 1,300 m$^2$/g. In another embodiment, the microporous surface area is in a range of about 1,000 m$^2$/g to about 1,300 m$^2$/g. In yet another embodiment, the microporous surface area is in a range of about 600 m$^2$/g to about 1,200 m$^2$/g.

The presence of micropores tends to provide a larger surface for the adsorption-desorption process of electrolyte ions.

3. Microporous Volume

The activated carbon particles may also be characterized in terms of microporous volume. For example, in one embodiment, the microporous volume, determined by the t-plot method, is in a range of about 0.1 cm$^3$/g to about 0.7 cm$^3$/g. In another embodiment, the microporous volume is in a range of about 0.4 cm$^3$/g to about 0.7 cm$^3$/g.

It is believed that the micropore volume may be controlled to increase the charge storage capacity of the activated carbons.

4. Cumulative Surface of Micropores of a Certain Size

The activated carbon particles may also be characterized in terms of cumulative surface area of micropores of a certain size range. For example, in one embodiment, the activated carbon particles have a cumulative surface area of micropores with a hydraulic radius in a range of 0.285 nm to 1.30 nm that is in a range of about 1,000 m²/g to about 3,000 m²/g. In another embodiment, the cumulative surface area of micropores with a hydraulic radius in a range of 0.285 nm to 1.30 nm is in a range of about 1,400 m²/g to about 2,600 m²/g. In yet another embodiment, the cumulative surface area of micropores with a hydraulic radius in a range of 0.285 nm to 1.30 nm is in a range of about 1,700 m²/g to about 2,700 m²/g.

It has been observed that the cumulative surface area of micropores with a hydraulic radius in a range of 0.285 nm to 1.30 nm influences the charge storage capacity of the carbon. For example, a cumulative surface area of micropores with a hydraulic radius in a range of 0.285 nm to 1.30 nm that is in a range is in a range 2,000-2,600 m²/g is believed to allow relatively easy access of electrolytes within the pores and thus provide higher charge storage capacity.

5. Cumulative Volume of Micropores of a Certain Size

The activated carbon particles may also be characterized in terms of cumulative volume of micropores of a certain size range. For example, in one embodiment, the cumulative volume of micropores with a hydraulic radius in a range of 0.285 nm to 1.30 nm is in range of about 0.35 cm³/g to about 1.6 cm³/g. In another embodiment, the cumulative volume of micropores with a hydraulic radius in a range of 0.285 nm to 1.30 nm is in a range about 0.6 cm³/g to about 1.1 cm³/g. In yet another embodiment, the cumulative volume of micropores with a hydraulic radius in a range of 0.285 nm to 1.30 nm is in a range of 0.4 cm³/g to about 1.4 cm³/g.

The cumulative volume and surface areas of micropores are alternative manners of quantifying the extent of the porosity within the aforementioned pore size range.

E. Specific Capacitance of Activated Carbon Particles

The activated carbon particles are particularly well suited for use as an electrode material in energy storage applications such as batteries and superconductors. Their suitability for such applications may be evaluated in terms of specific capacitance ($C_{sp}$).

In an embodiment, activated carbon particles prepared using a two-step process have a specific capacitance at a current density of 1 Amperes/gram (A/g), that is in a range of about 130 Farads/gram (F/g) to about 330 F/g. In another embodiment, the specific capacitance, at a current density of 1 A/g, is in a range of about 160 F/g to about 210 F/g. In yet another embodiment, the specific capacitance, at a current density of 1 A/g, is in a range of about 110 F/g to about 260 F/g.

In an embodiment, activated carbon particles prepared using a one-step process have a specific capacitance at a current density of 1 Amperes/gram (A/g), that is in a range of about 100 F/g to about 250 F/g; at a current density of 5 Amperes/gram (A/g), the specific capacitance is in a range of about 80 Farads/gram (F/g) to about 175 F/g; and at a current density of 10 Amperes/gram (A/g), the specific capacitance is in a range of about 60 Farads/gram (F/g) to about 160 F/g.

IV. Energy Storage Device

Activated carbon particles of the present invention have been tested in an energy storage device and the activated carbon particles contributed to the device having a high rate stability.

For example, on increasing discharge current from 3 A/g to 15 A/g, an electrode formed from two-step activated carbon particle retained over 80% of its initial charge storage capacity. Additionally, a supercapacitor device fabricated using these two-step carbon particles retained over 95% of its initial charge storage capacity over 5,000 cycles of charge-discharge study with almost 100% Coulombic efficiency.

Figure 22:
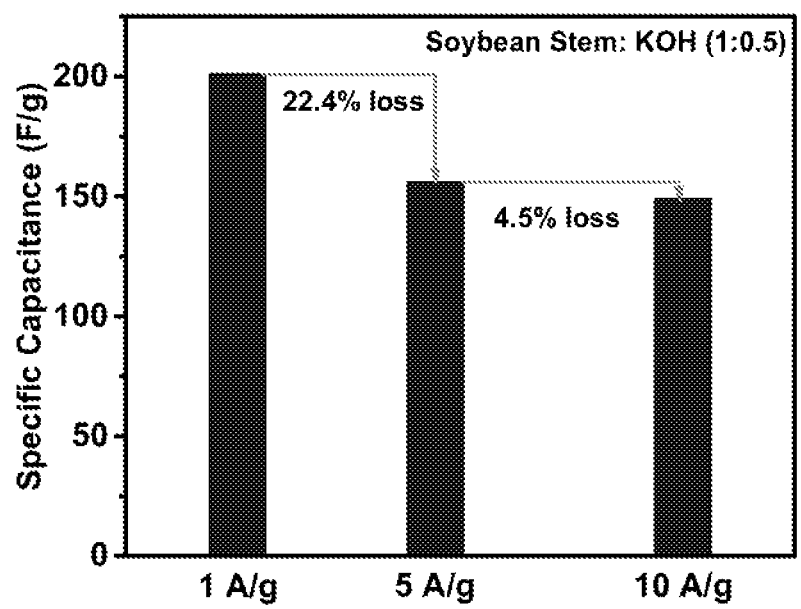
FIG. 22 a graph comparing the charge storage capacity rate capability at three current densities (1 A/g, 5 A/g, and 10 A/g) of a soybean stem-based activated carbon (1:0.5) synthesized using the one-step process.
Figure 23:
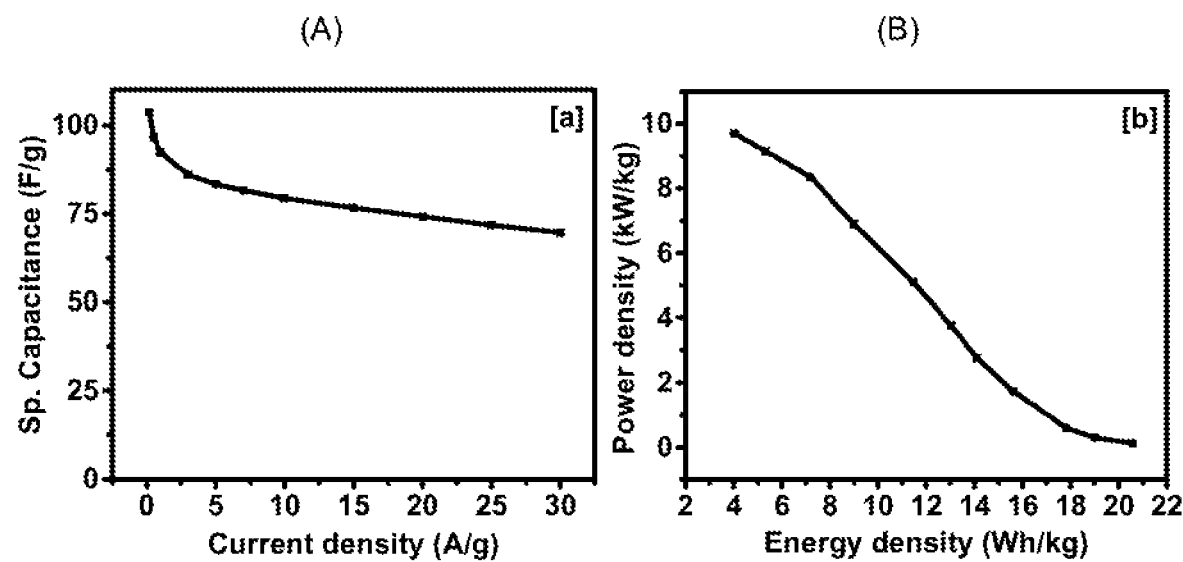
FIG. 23 (A) is a graph showing charge storage capacity as a function of applied current density and (B) showing a power density as a function of energy density of a device fabricated using one-step process with stem:KOH (1:1) activated carbon in 6M KOH electrolyte.

For example, on increasing discharge current from 1 A/g to 5 A/g, an electrode formed from one-step activated carbon particle retained about 78.5% of its initial charge storage capacity. On a further increase from 5 A/g to 10 A/g only another 4.5% loss of charge capacity was observed (i.e., it retain about 74% of its initial charge storage capacity) (shown in FIG. 22). Additionally, a supercapacitor device fabricated using these one-step carbon particles retained over 90% of its initial charge storage capacity over 10,000 cycles of charge-discharge study with almost 100% Coulombic efficiency (shown in FIG. 24(A)).

V. Examples

A. Synthesis

Activated carbon samples were synthesized from soybean leaves, stems, and shells. The soybean material was cleaned and dried at 60° C. The dried material was crushed into a fine powder. This powder was the precursor for samples prepared using a one-step process. For samples prepared using a two-step process, the powder was subjected to a thermal pretreatment at 350° C. for 2 hours under nitrogen atmosphere to release volatile, low-stability molecules within the plant material powder thereby producing a partially carbonized plant powder, which was the precursor suitable for activation and pyrolyzation.

An activation-pyrolyzation treatment of the precursor was performed. The activation-pyrolyzation treatment comprised mixing the precursor with a KOH activating agent to form a precursor-activating agent mixture. The KOH reacted with carbon in the precursor during the activation-pyrolyzation treatment thereby forming one or more products that are suitable to be removed during a washing treatment conducted after the activation-pyrolyzation treatment. In particular, it is believed at least the reaction of Equation (1) occurred:

$$6KOH + 2C \text{ (from the precursor)} \rightarrow 2K + 3H_2 + 2K_2CO_3 \quad (1)$$

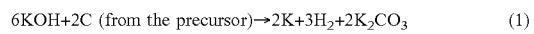

Various precursor:activating agent mass ratios were selected (e.g., 1:0.125, 1:0.25, 1:0.5, 1:1, 1:2, and 1:3) to evaluate the effect(s) of the resulting activated carbon (e.g., on surface area). For example, one gram of the precursor was mixed one gram of KOH pellets to achieve a 1:1 mass ratio. A precursor sample without being mixed with KOH activation agent was used as a control.

The precursor-activating agent mixture was then heated in a pyrolyzation inert atmosphere of nitrogen (in a tube furnace under nitrogen flow) at a pyrolyzation temperature of about 800° C. for a pyrolyzation duration of about 2 hours, which was sufficient to complete the carbonization of the precursor thereby forming an activated-pyrolyzed material.

Afterward, the activated-pyrolyzed material was ground into a powder subjected to a washing treatment with one or more washing liquids suitable to reduce or remove the one or more products of the reaction between carbon and the activating agent (in this case potassium carbonate). In particular, the materials were washed with an aqueous 1M HCl washing liquid and subsequently with deionized water. The hydrochloric acid reacted with the potassium carbonate to form carbon dioxide gas that evolved away and solute potassium chloride, which was removed with the deionized water. The activated carbon particles were dried at 60° C. overnight.

1. Specific Capacitance

As shown in FIG. 1, carbon from soybean leaves has substantially greater specific capacitance than commercially available carbon used for batteries and supercapacitors. Carbon from soybean leaves had a much higher energy storage capacity compared to commercial carbon. For example, at 10 A/g, commercial carbon stored 16 F/g whereas carbon from soybean leaves stored 121 F/g, a more than 7.5 times greater energy storage capacity. Additionally, carbon from soybean leaves demonstrates a more stable rate capability. For example, on increasing the discharge current density from 3 A/g to 15 A/g, commercial carbon retained only 16.3% of its initial charge storage capacity, whereas carbon from soybean leaves retained 83.1% of its initial storage capacity.

2. X-Ray Diffraction

Figure 2:
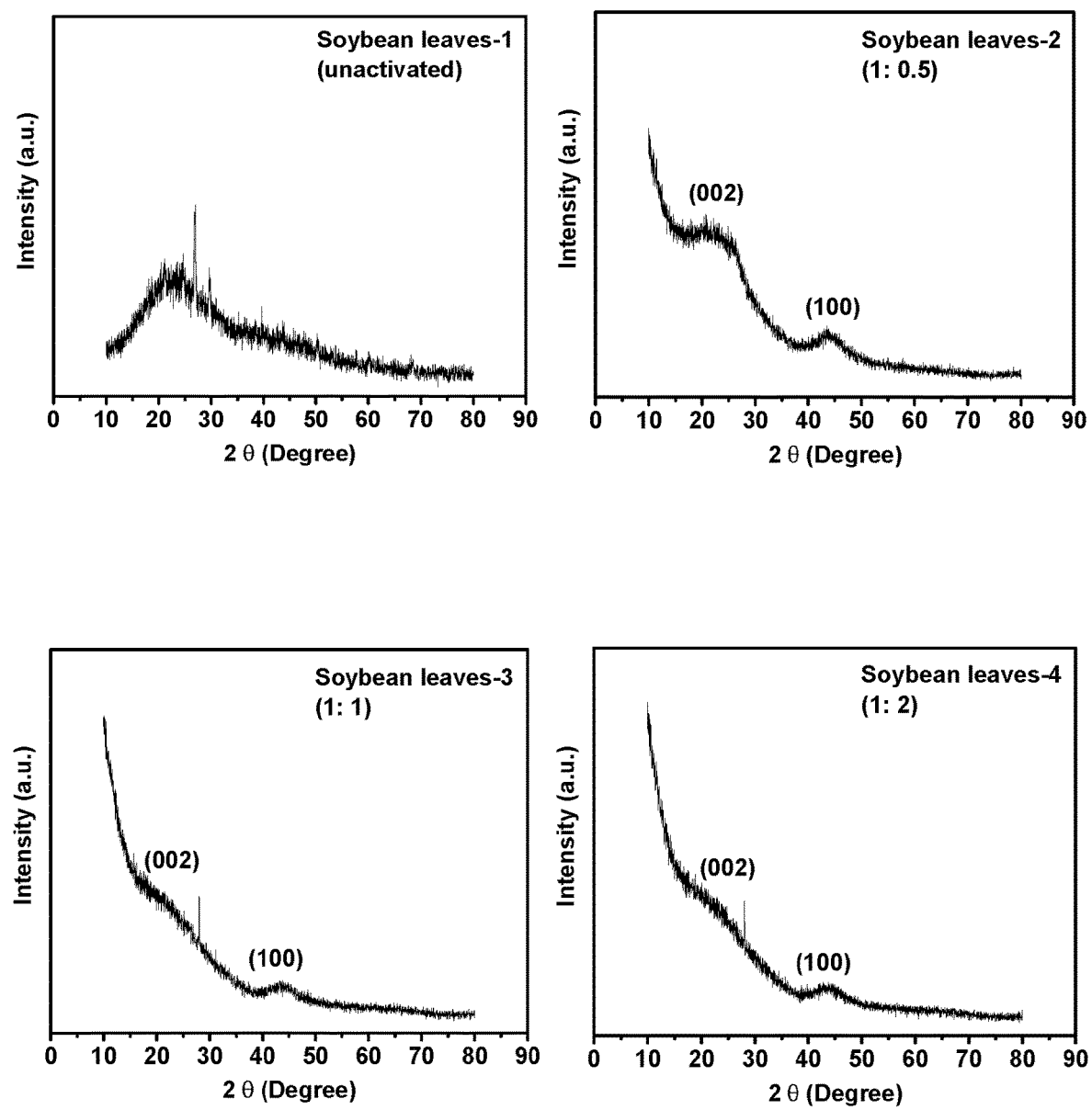
FIG. 2 contains XRD patterns of carbon derived from soybean leaves at leaf to KOH mass ratios of 1:0 (unactivated), 1:0.5, 1:1, and 1:2.
Figure 9:
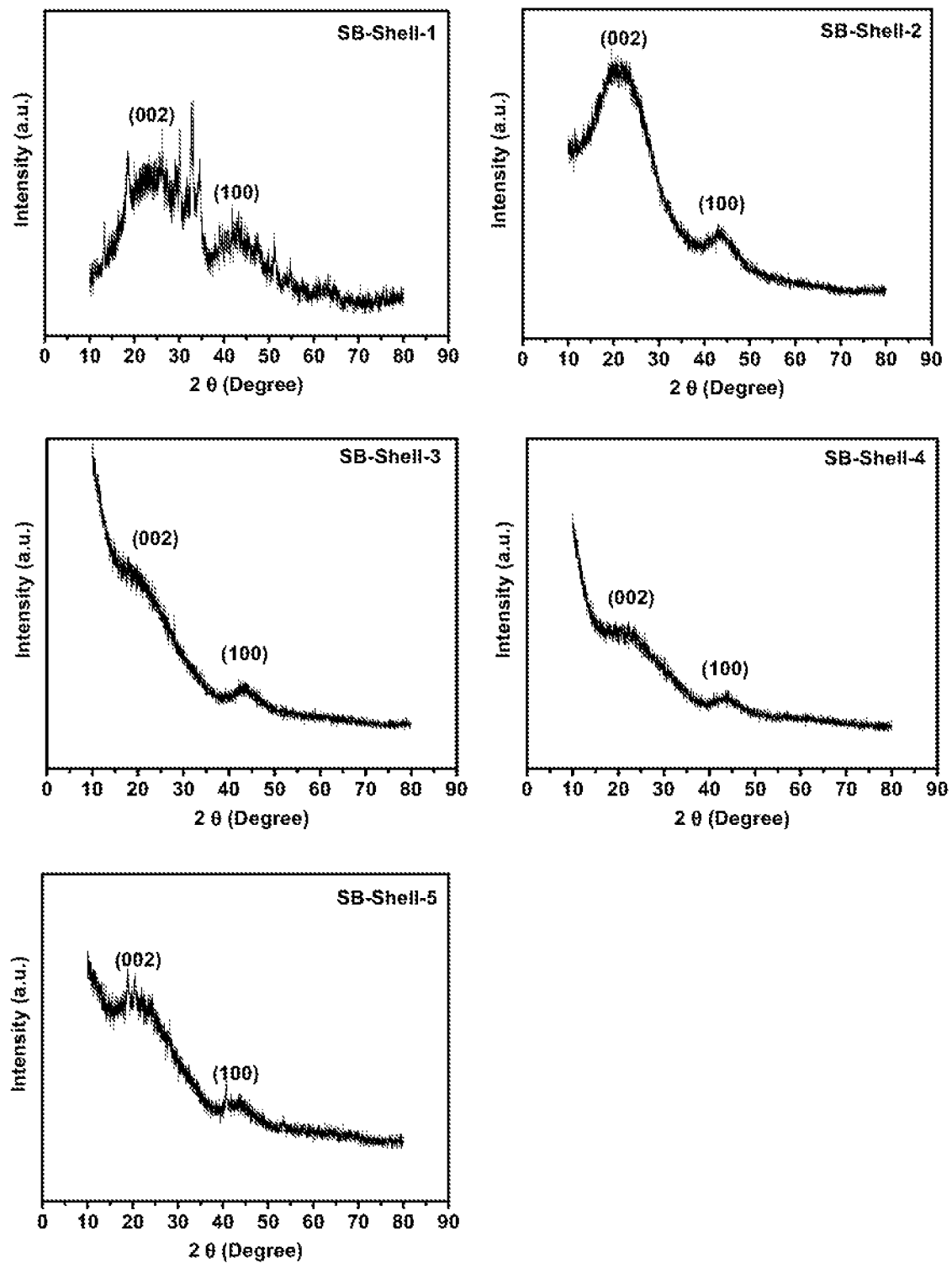
FIG. 9 contains XRD patterns of carbon derived from soybean shells activated at shell to KOH mass ratios of 1:0 (unactivated, SB-Shell-1), 1:0.5 (SB-Shell-2), 1:1 (SB-Shell-3), 1:2 (SB-Shell-4), and 1:3 (SB-Shell-5).
Figure 10:
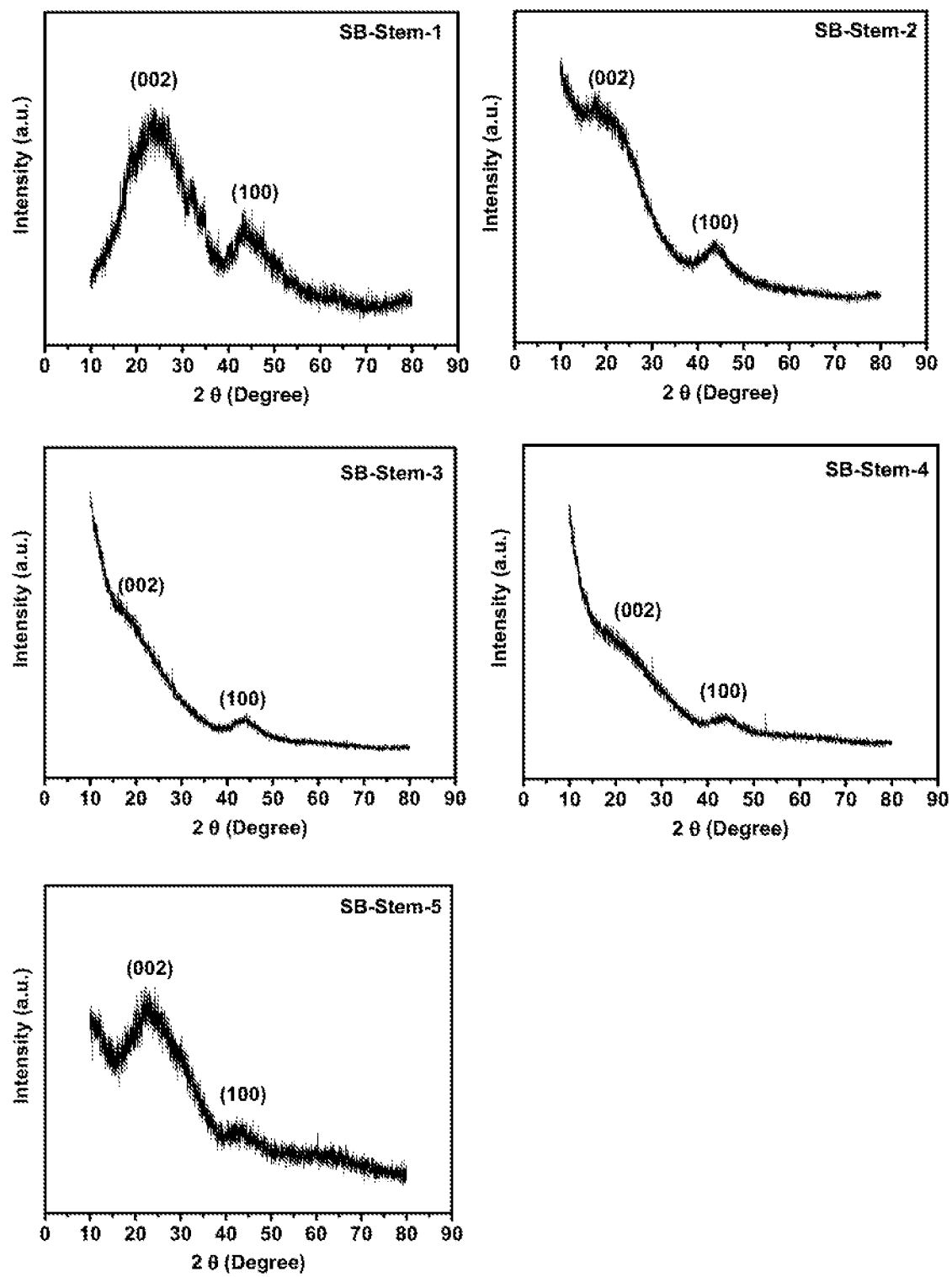
FIG. 10 contains XRD patterns of carbon derived from soybean stems activated at stem to KOH mass ratios of 1:0 (unactivated, SB-Stem-1), 1:0.5 (SB-Stem-2), 1:1 (SB-Stem-3), 1:2 (SB-Stem-4), and 1:3 (SB-Stem-5).

The synthesized carbon samples were characterized using X-ray powder diffraction (Shimadzu X-ray diffractometer) method using 2θ-θ scan and $CuK_{\alpha 1}$ (λ=1.5406 Å) as the radiation source. FIGS. 2, 9, and 10 display the XRD patterns of unactivated and activated carbons from leaves, shells, and stems with a different mass ratio of KOH. XRD peaks centered around 2θ of 24° and 44° in the activated carbon samples correspond to (002) and (100) planes of the graphitic carbon. The presence of the graphitic phase indicates suitability as an electrode material. Broad and low-intensity peaks indicate the disordered nature of the carbon samples. In general, the graphitic carbon peaks tend to become broader and tend to reduce in intensity with KOH mass ratio increase, suggesting a decrease in a graphitic structure in the carbon samples. These observations reveal that the degree of graphitization of the carbon sample is largely a function of the chemical activation.

3. Raman Spectroscopy

Figure 5:
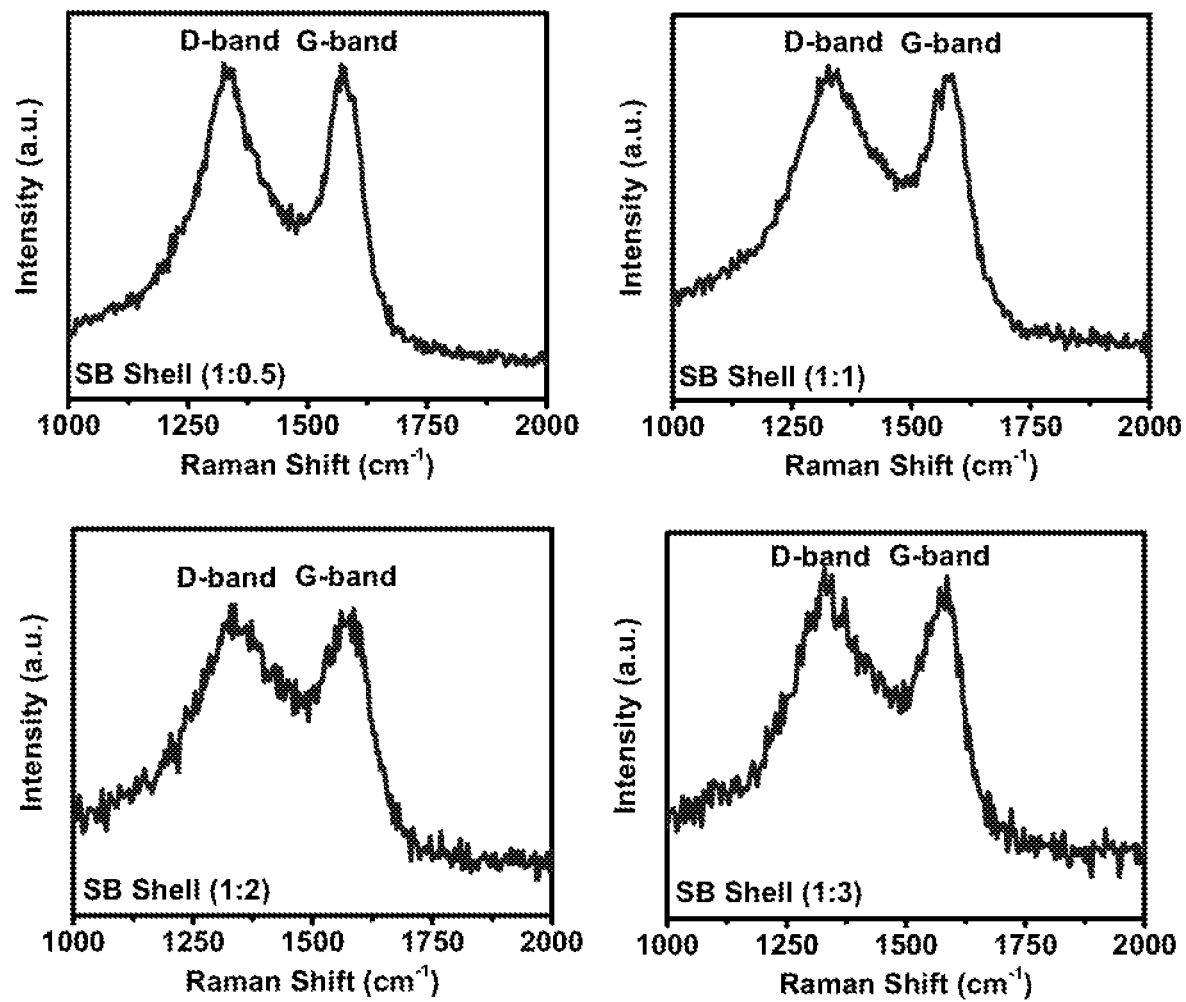
FIG. 5 contains Raman spectra of carbon derived from soybean shell material activated at shell to KOH mass ratios of 1:0.5, 1:1, 1:2, and 1:3.
Figure 6:
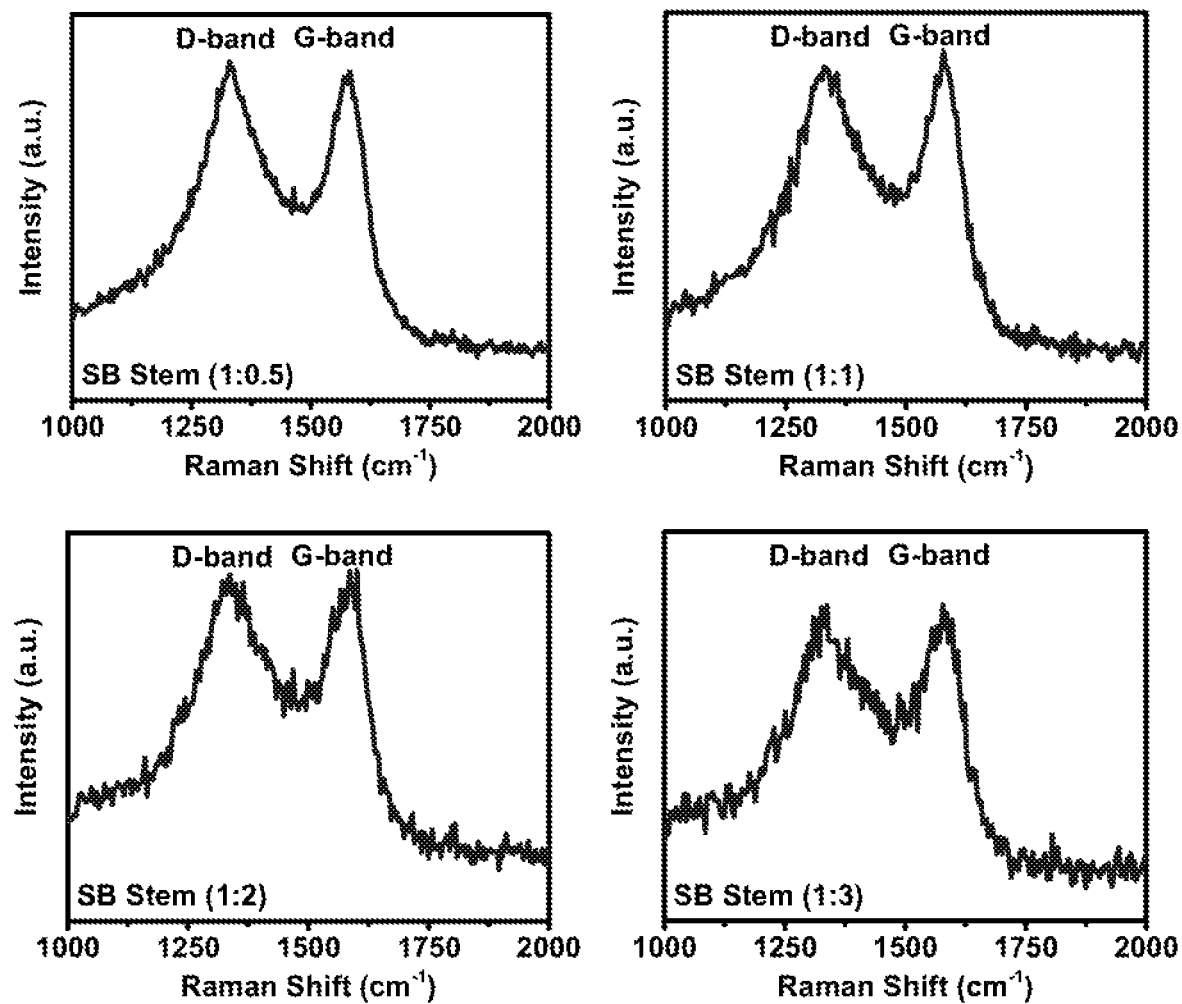
FIG. 6 contains Raman spectra of carbon derived from soybean stem material activated at stem to KOH mass ratios of 1:0.5, 1:1, 1:2, and 1:3.
Figure 7:
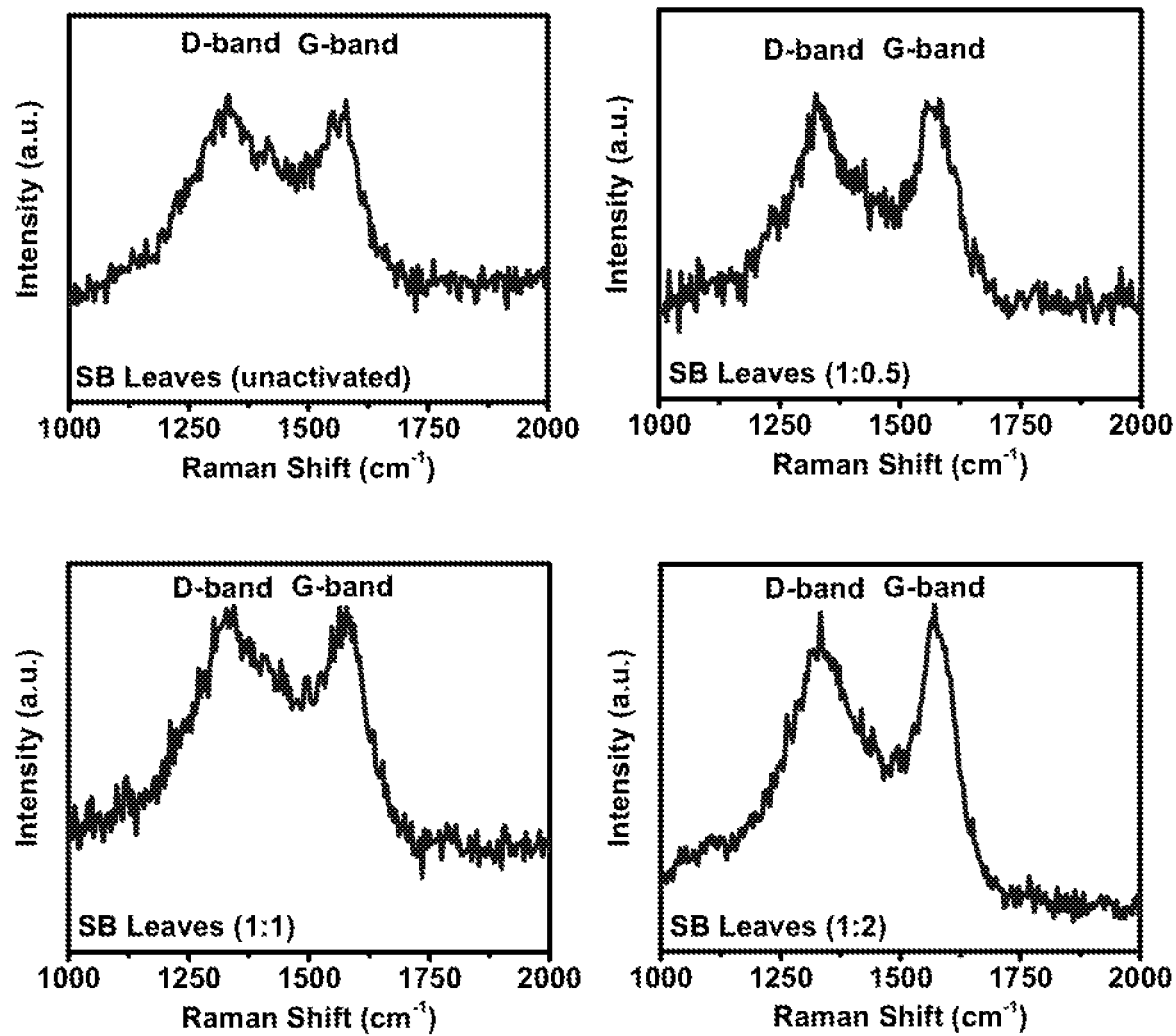
FIG. 7 contains Raman spectra of carbon derived from soybean shell material activated at leaf to KOH mass ratios of 1:0 (unactivated), 1:0.5, 1:1, and 1:2.

Argon ion laser Raman spectroscopy was used to determine G- and D-bands of carbon using a wavelength of 514.5 nm as the excitation source. Raman spectroscopy was used to determine graphitic and diamond phases of the carbon produced from soybean shell, stem, and leaves as shown in FIGS. 5-7, respectively. Two characteristic peaks around 1354 and 1591 $cm^{-1}$ were observed in all the samples, which can be assigned to D-band and G-band of carbon, respectively. The presence of the graphitic phase is advantageous as this is the conducting phase of the carbon.

4. Nitrogen Adsorption-Desorption Isotherms

The surface areas of the samples were measured using nitrogen adsorption-desorption isotherms, which were performed using ASAP 2020 volumetric adsorption analyzer (Micrometrics, USA) at 77 K. Prior to the analysis, samples were degassed for 24 hours at 90° C. to remove any adsorbed gas on the surface and in the pores of the carbon.

Figure 3:
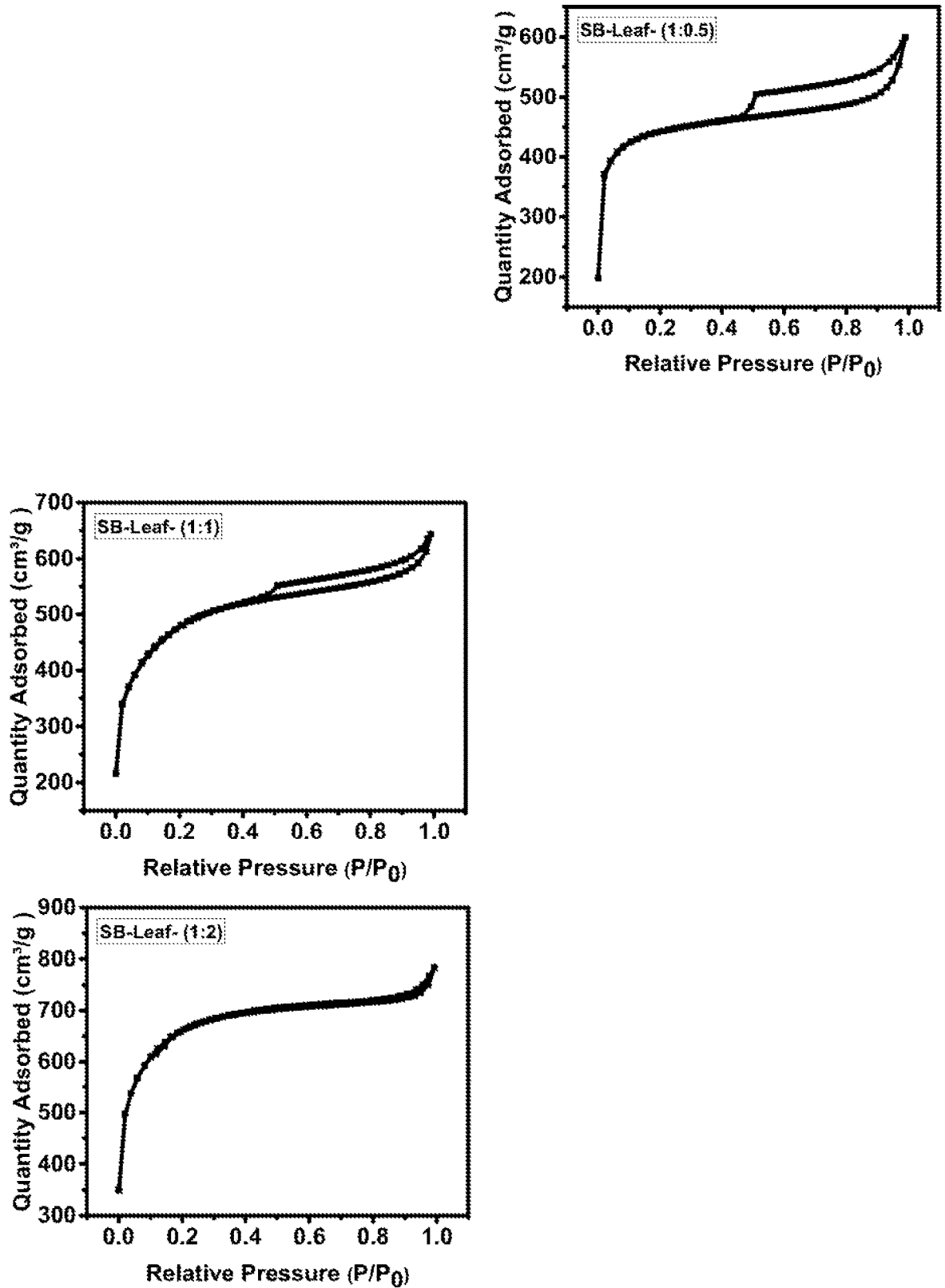
FIG. 3 contains nitrogen adsorption-desorption isotherms of carbons derived from soybean leaves activated at leaf to KOH mass rations of 1:0.5, 1:1, and 1:2.
Figure 11:
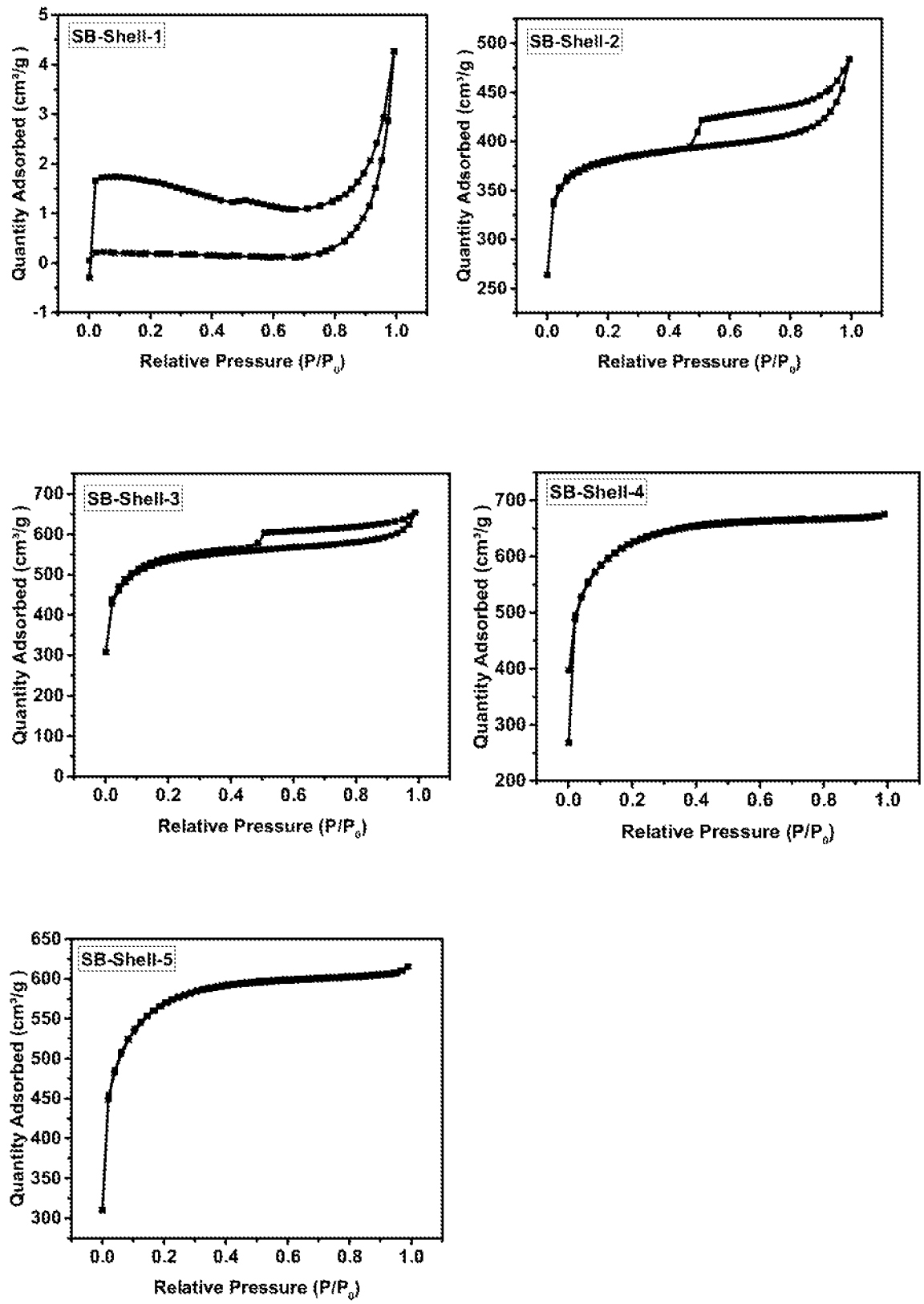
FIG. 11 contains nitrogen adsorption-desorption isotherms of carbons derived from soybean shells activate at shell to KOH mass ratios of 1:0 (unactivated, SB-Stem-1), 1:0.5 (SB-Stem-2), 1:1 (SB-Stem-3), 1:2 (SB-Stem-4), and 1:3 (SB-Stem-5).
Figure 12:
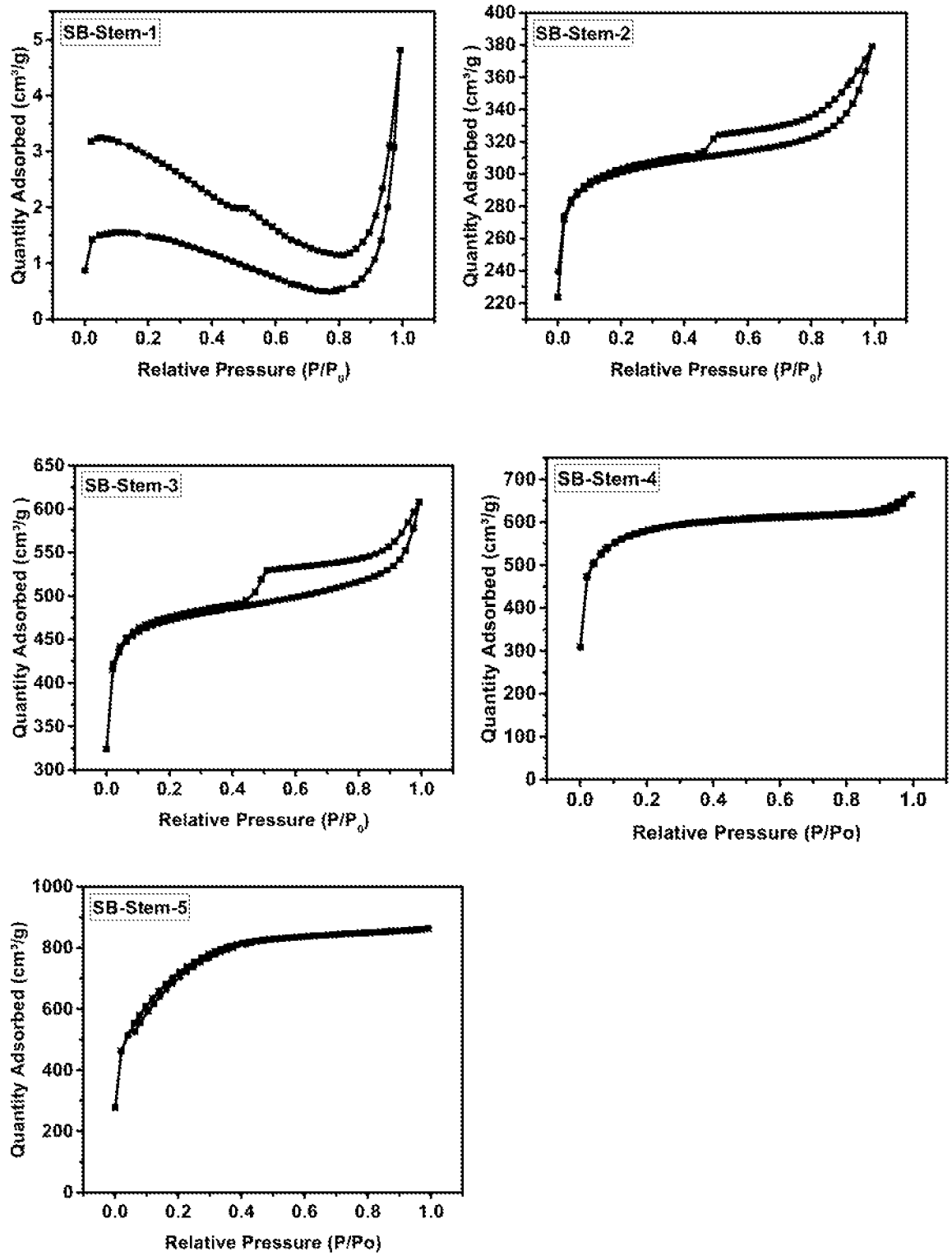
FIG. 12 contains nitrogen adsorption-desorption isotherms of carbons derived from soybean stems activate at stem to KOH mass ratios of 1:0 (unactivated, SB-Stem-1), 1:0.5 (SB-Stem-2), 1:1 (SB-Stem-3), 1:2 (SB-Stem-4), and 1:3 (SB-Stem-5).

The nitrogen adsorption-desorption isotherms of unactivated and activated soybean leaves, shells and stems are illustrated in FIGS. 3, 11, and 12. It is evident that the pore size and specific surface area of the activated carbon were influenced by the soybean material:activating mass ratio. Generally, increasing the relative amount of activating agent tends to increase the surface area. For example, the surface area of shell carbon increased from 1 $m^2/g$ to 2005 $m^2/g$ on activating with KOH. Shell/stem samples activated using higher amounts of KOH showed type I isotherm curves with the majority of $N_2$ adsorption at relative pressures (P/Po) below 0.35 and a near parallel slope (to the x-axis) of the isotherm above 0.35 of P/Po, which is typical to micropores in the carbon. On the other hand, activation using a lower amount of KOH showed a combination of type I and IV isotherm curves with the appearance of distinguishable hysteresis loops at P/Po over 0.5, demonstrating the existence of both micropores and mesopores structure. In contrast, very low $N_2$ adsorption of unactivated samples indicates the almost non-existence of the porous structure.

5. BJH Pore Distribution

Figure 4:
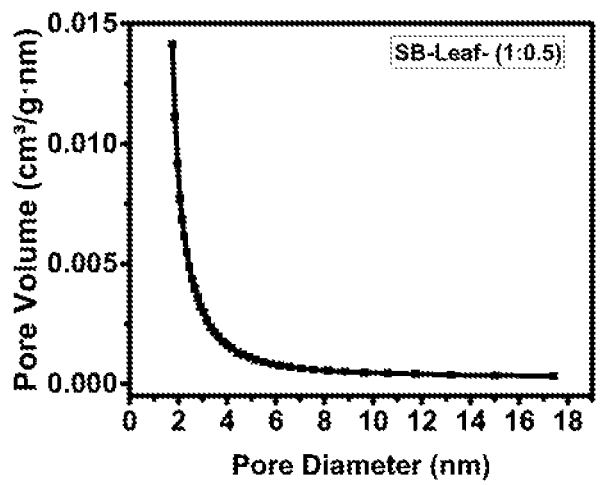
FIG. 4 contains BJH pore size distribution plots of activated carbons derived from soybean leaves activated at leaf to KOH mass ratios of 1:0.5, 1:1, and 1:2.
Figure 4:
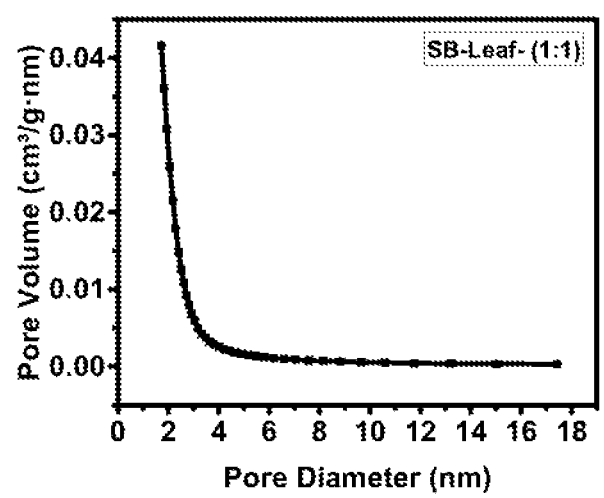
Figure 4:
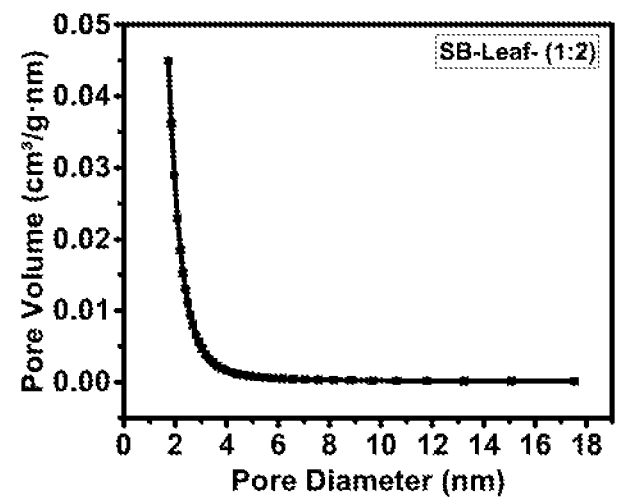
Figure 13:
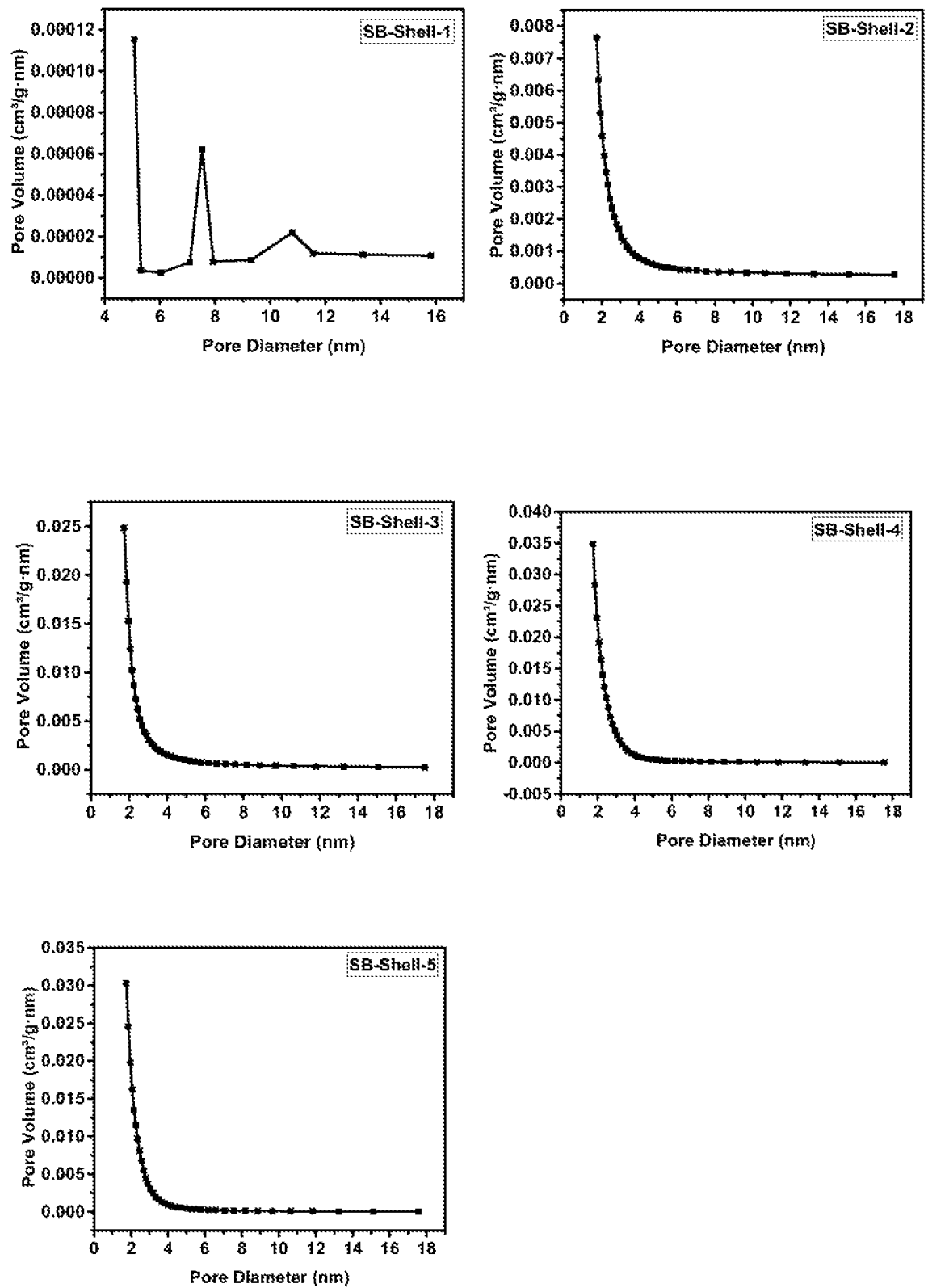
FIG. 13 contains BJH pore size distribution plots of activated carbons derived from soybean shells activated at shell to KOH mass ratios of 1:0 (unactivated, SB-Stem-1), 1:0.5 (SB-Stem-2), 1:1 (SB-Stem-3), 1:2 (SB-Stem-4), and 1:3 (SB-Stem-5).
Figure 14:
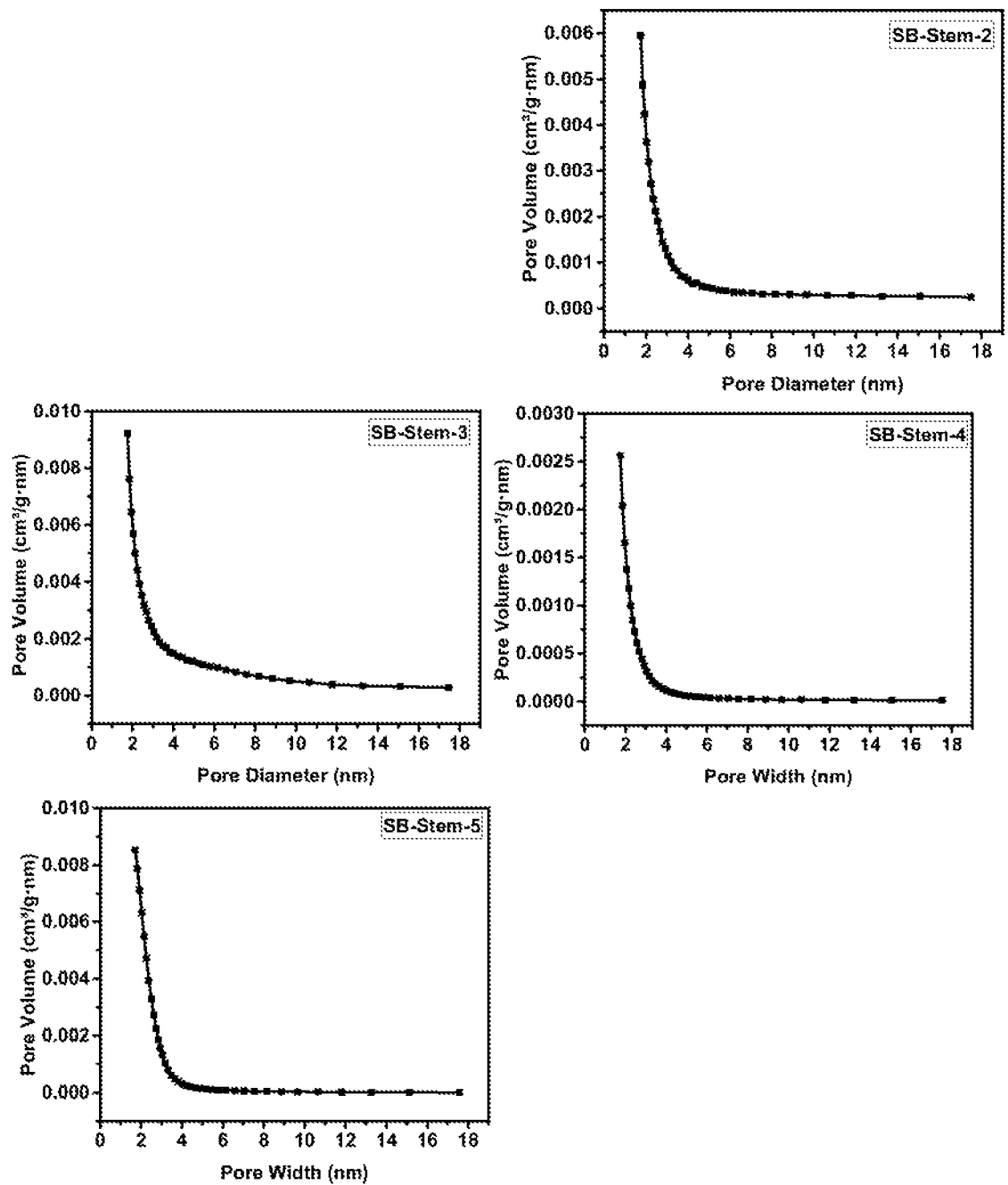
FIG. 14 contains BJH pore size distribution plots of activated carbons derived from soybean stems activated at stem to KOH mass ratios of 1:0.5 (SB-Stem-2), 1:1 (SB-Stem-3), 1:2 (SB-Stem-4), and 1:3 (SB-Stem-5).

These observations were further confirmed by the BJH pore size distribution plots set forth in FIGS. 4, 13, and 14. The pore sizes of the carbons derived from soybean leaves, shells, and stems is centered around 2 nm.

6. Scanning Electron Microscope Images

Figure 8:
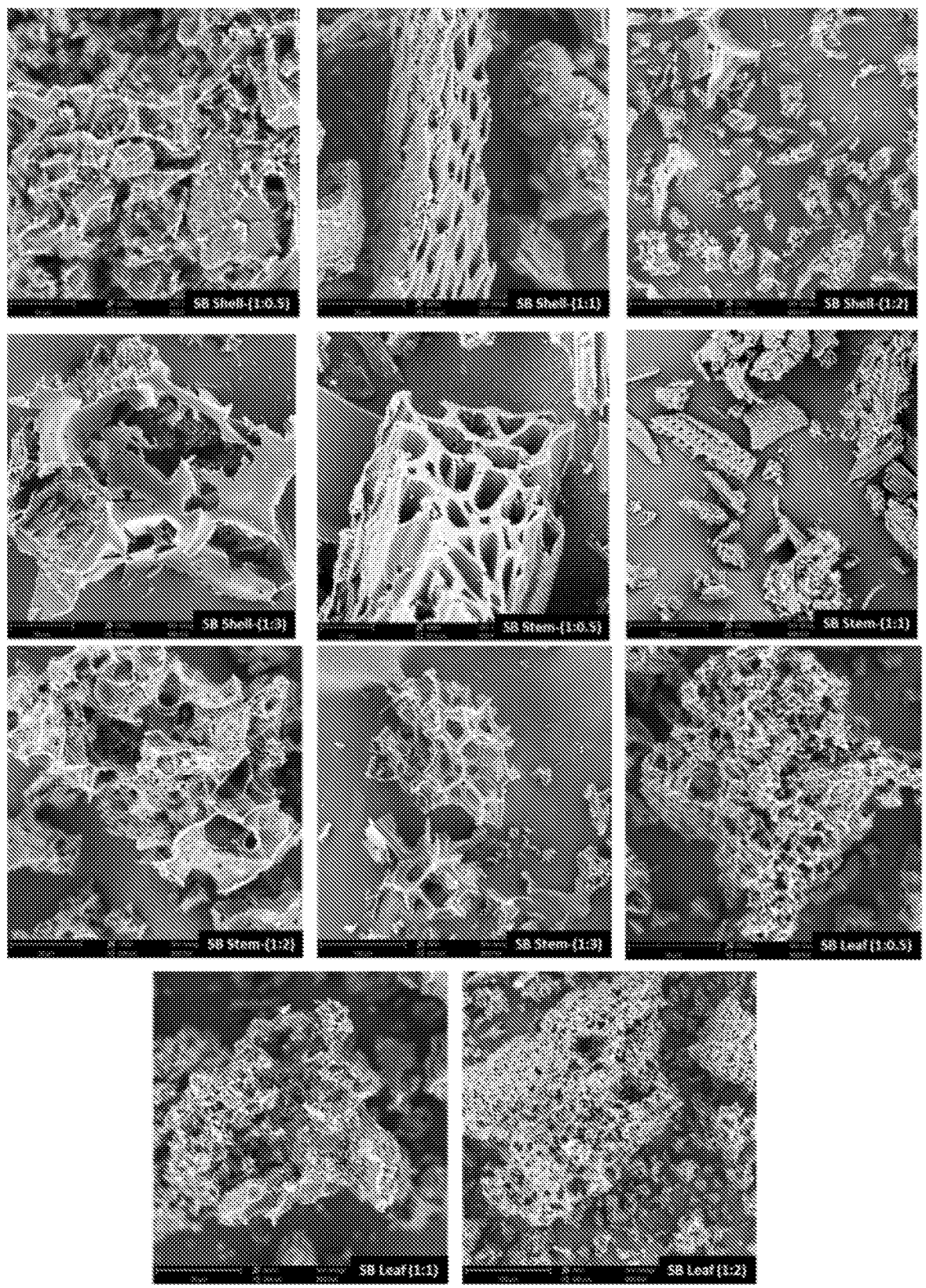
FIG. 8 contains Scanning Electron Microscopy (SEM) images of carbon derived from soybean shell, stem, and leaf materials that were activated at the indicated soybean material to KOH mass ratios.

Microporous structure and morphology of all the samples were evaluated using field emission scanning electron microscopy. Scanning electron microscope (SEM) images are shown in FIG. 8. It is clear from the SEM images that KOH activation modified the surface of the carbon derived from soybean material. High porosity in the soybean derived carbon provides a higher surface area for electrolyte ions, which tends to increase charge storage capacity.

Pore and surface area characteristics of activated carbons from soybean leaves, shells, and stems are set forth in Table A below.

TABLE A

| Sample Code | Soybean material:KOH ratio | % N | Sp. Capacitance (F/g) at 1 A/g | BET surface area ($m^2/g$) | t-plot microporous area ($m^2/g$) | t-plot micropore volume ($cm^3/g$) | Adsorption average pore diameter by BET (nm) | BJH Desorption average pore width (nm) | Cumulative surface area of pores between 0.285 nm and 1.30 nm hydraulic radius ($m^2/g$) | Cumulative pore volume of pores between 0.285 nm and 1.30 nm hydraulic radius ($cm^3/g$) |
|---|---|---|---|---|---|---|---|---|---|---|
| SB-Shell-2 (SB-1) | 1:0.5 | 1.69 | 132 | 1201 | 1000 | 0.4997 | 1.58 | 3.93 | 1797 | 0.619 |
| SB-Shell-3 (SB-2) | 1:1 | 1.41 | 328 | 1707 | 1152 | 0.57898 | 1.37 | 3.09 | 2283 | 0.883 |
| SB-Shell-4 (SB-4) | 1:2 | 0.68 | 184 | 2004 | 1242 | 0.6249 | 1.24 | 2.29 | 2642 | 1.049 |
| SB-Shell-5 (SB-5) | 1:3 | 0.69 | 225 | 1820 | 1177 | 0.5917 | 1.33 | 2.30 | 2430 | 0.945 |
| SB-Stem-2 (SB-3) | 1:0.5 | 1.73 | 169 | 924 | 793 | 0.3963 | 1.65 | 4.07 | 1442 | 0.486 |

TABLE A-continued

| Sample Code | Soybean material: KOH ratio | % N | Sp. Capacitance (F/g) at 1 A/g | BET surface area (m²/g) | t-plot microporous area (m²/g) | t-plot micropore volume (cm³/g) | Adsorption average pore diameter by BET (nm) | BJH Desorption average pore width (nm) | Cumulative surface area of pores between 0.285 nm and 1.30 nm hydraulic radius (m²/g) | Cumulative pore volume of pores between 0.285 nm and 1.30 nm hydraulic radius (cm³/g) |
|---|---|---|---|---|---|---|---|---|---|---|
| SB-Stem-3 (SB-6) | 1:1 | 0.54 | 168 | 1491 | 1225 | 0.612 | 1.57 | 3.83 | 2208 | 0.779 |
| SB-Stem-4 (SB-7) | 1:2 | 0.43 | 205 | 1852 | 1272 | 0.638 | 1.35 | 2.55 | 2529 | 0.960 |
| SB-Stem-5 (SB-8) | 1:3 | 0.83 | 207 | 2470 | 377 | 0.182 | 0.97 | 2.34 | 2551 | 1.322 |
| SB-Leaves-2 (SB-9) | 1:0.5 | 1.03 | 253 | 1395 | 1027 | 0.514 | 1.43 | 12.7 | 1938 | 0.735 |
| SB-Leaves-3 (SB-10) | 1:1 | — | 118 | 1591 | 626 | 0.309 | 1.12 | 2.82 | 1792 | 0.844 |
| SB-Leaves-4 (SB-11) | 1:2 | 0.55 | 204 | 2126 | 1184 | 0.600 | 1.27 | 2.31 | 2672 | 1.11 |

As seen, these carbons show the presence of micropores and mesopores, which are beneficial to the activated carbon-based material used in energy storage applications. The presence of micropores provides a larger surface for the adsorption-desorption process of electrolyte ions. The presence of mesopores ensures accessibility to the surface area and offer wider channels for several electrolyte ions to diffuse at the same time without experiencing a geometric resistance. It is believed that these aspects make the activated carbon materials of the present invention suitable for use with a variety of electrolytes. As such, the material may be used in the fabrication of supercapacitors or batteries such as lithium ion, sodium ion, and potassium ion batteries/supercapacitors.

7. Effect of Electrolyte

Figure 15:
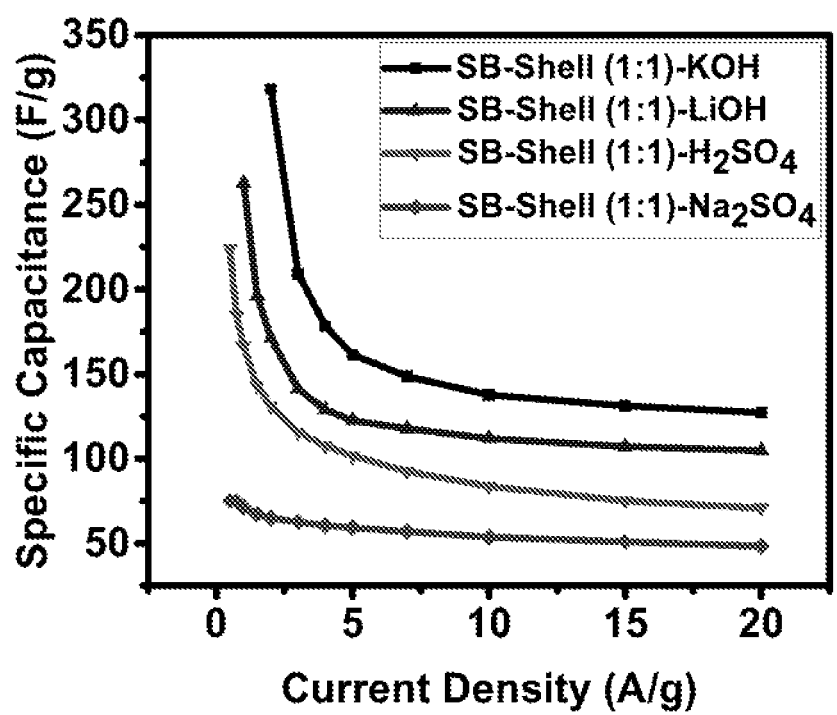
FIG. 15 shows the variation of specific capacitance of sample SB-Shell-3 (i.e., activated carbon derived from soybean shells at a shell to KOH mass ration of 1:1) as a function of applied current density in various electrolytes.

The electrochemical properties of SB-2 (selected as a representative material) were further investigated in different electrolytes. Alkaline (KOH and LiOH), acidic ($H_2SO_4$) and salt ($Na_2SO_4$) solutions were used for this study. FIG. 15 shows the variation of specific capacitance as a function of applied current density in various electrolytes.

8. Effect of Nitrogen Doping

Figure 16:
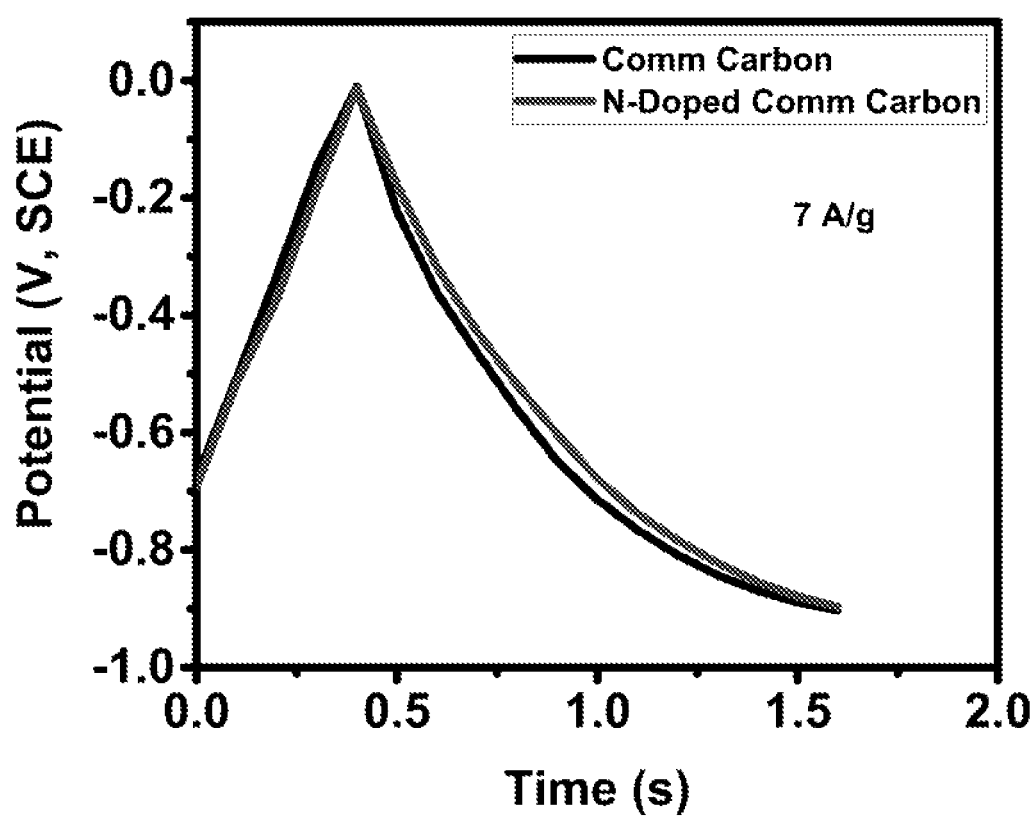
FIG. 16 is a charge-discharge profile of commercial carbon and nitrogen-doped commercial carbon.

Commercial carbon was doped with nitrogen using urea. For this 1:2 ratio of commercial and urea (200 mg of commercial carbon and 400 mg of urea) were dissolved in 5 ml DI water. The solution was sonicated for 2 hours in a bath sonicator and then the mixture was dried on a hot plate at 85° C. The dry powder was carbonized at 800° C. (5° C./min) for 2 hours under nitrogen. After cooling to room temperature naturally, the powder was washed with DI water. The washed powder was dried at 65° C. in a conventional oven overnight. The charge-discharge profile of commercial carbon and nitrogen doped commercial carbon is shown in FIG. 16. As seen in the FIG. 16, nitrogen doping did not improve the energy storage capacity of the commercial carbon. Although the doping method may have been ineffective, it is believed that this testing shows that the properties achieved by material of the claimed invention are due, at least in part, to the presence of nitrogen atoms from the biomass being substituted for carbon atoms in the crystal lattice structure of the G-band carbon $sp^2$ hybridized graphitic phase nitrogen.

9. Testing of Capacitance Retention and Coulombic Efficiency

Figure 17:
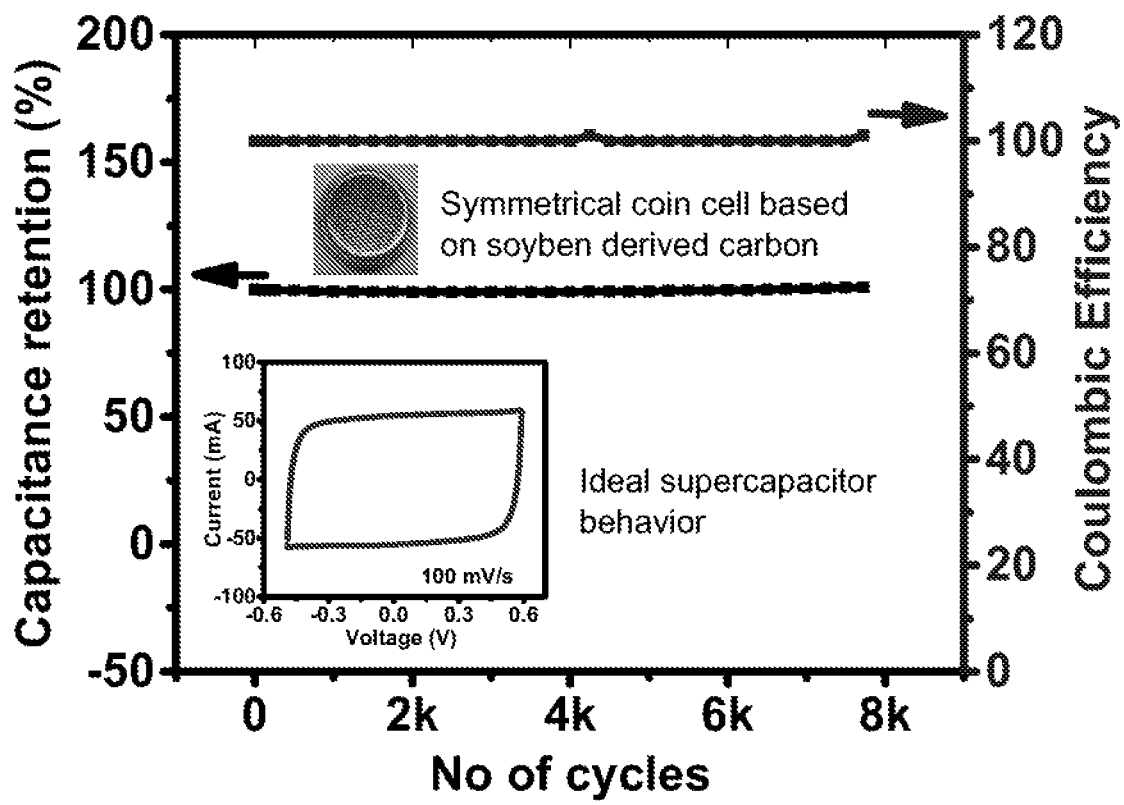
FIG. 17 is a graph of % of capacitance retention and coulombic efficiency as a function of the number of charge-discharge cycles for a coin cell supercapacitor fabricated using an activated carbon material of one embodiment of the present invention.

Referring to FIG. 17, a coin cell supercapacitor was formed using a two-step activated carbon material of the present invention as the electrode material. As is depicted in FIG. 17, the supercapacitor's performance was very similar to that of an ideal capacitor. The device underwent over 8,000 charge-discharge cycles and the performance was very stable with almost 100% coulombic efficiency.

Figure 24:
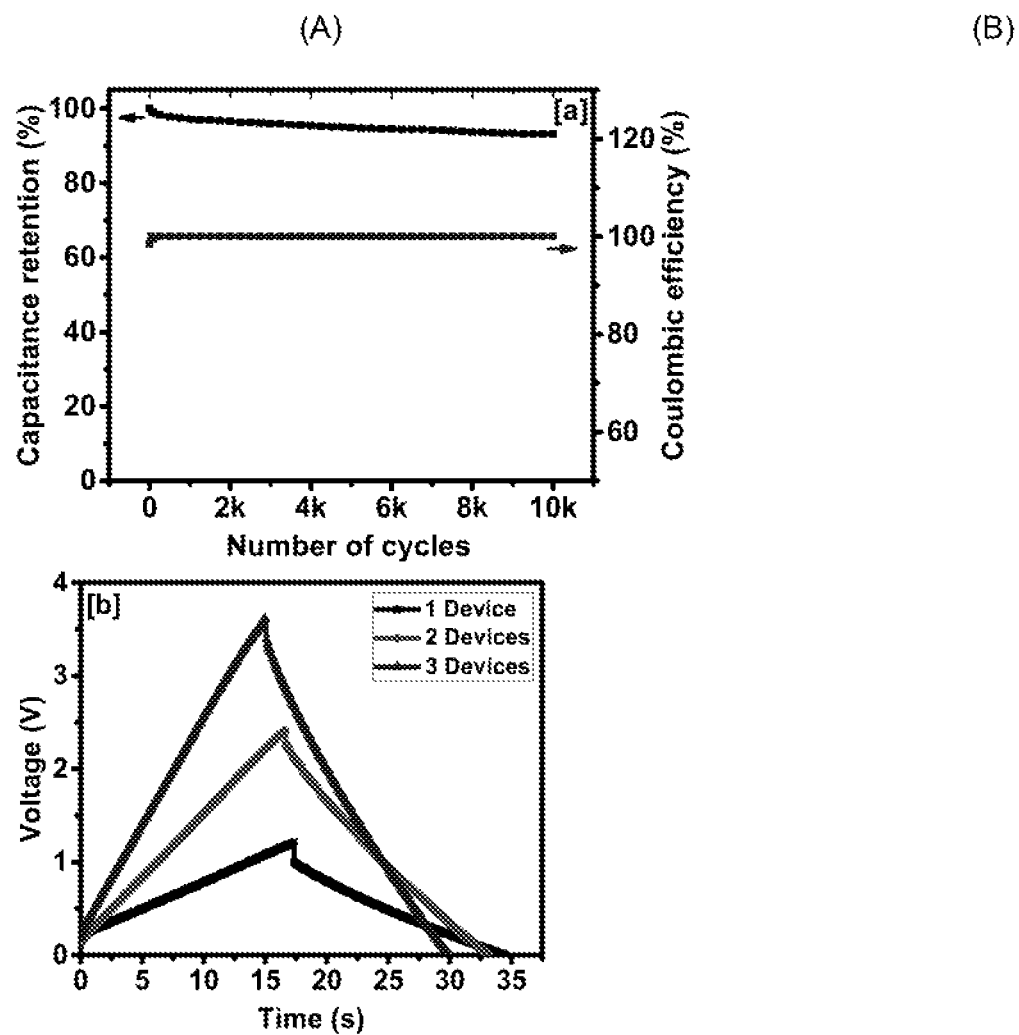
FIG. 24 (A) is a graph showing capacitance retention and Coulombic efficiency as function of charge-discharge cycles for a device using soybean stem:KOH (1:1) activated carbon made using one-step process, and (B) is graph showing charge-discharge characteristics of a Device 1, Devices 1 and 2 connected in series, and Devices 1, 2, and 3 connected in series, wherein each of the devices were fabricated using one-step synthesized carbon using soybean stem:KOH (1:1) activated carbon, and wherein Device 1 utilized 6M KOH as an electrolyte, Device-2 utilized 6M NaOH as an electrolyte, and Device-3 utilized 6M LiOH as an electrolyte.

Referring to FIG. 24 (A) a coin cell supercapacitor was formed using a two-step activated carbon material of the present invention as the electrode material. As is depicted in FIG. 24(A), the devices underwent over 10,000 charge-discharge cycles and the performance was very stable, retaining over 90% of its initial charge storage, with almost 100% Coulombic efficiency.

VI. Conclusion

Having illustrated and described the principles of the present invention, it should be apparent to persons skilled in the art that the invention can be modified in arrangement and detail without departing from such principles.

Although the materials and methods of this invention have been described in terms of various embodiments and illustrative examples, it will be apparent to those of skill in the art that variations can be applied to the materials and methods described herein without departing from the concept, spirit and scope of the invention. All such similar substitutes and modifications apparent to those skilled in the art are deemed to be within the spirit, scope and concept of the invention as defined by the appended claims.

What is claimed is:

1. An activated carbon powder comprising activated carbon particles, wherein the activated carbon particles have a Brunauer-Emmett-Teller (BET) surface area that is in a range of about 900 m²/g to about 2,500 m²/g, and wherein the activated carbon particles comprise:
 (a) carbon that comprises:
  (i) D-band carbon corresponding to a $sp^3$ hybridized disordered carbon phase; and
  (ii) G-band carbon corresponding to a $sp^2$ hybridized graphitic phase;
 wherein the D-band carbon and G-band carbon are at a proportion, determined using Raman spectroscopy to arrive at relative intensities of D-band carbon ($I_D$) and G-band carbon ($I_G$), such that a $I_G/I_D$ ratio is in a range of 0 to about 2;
(b) nitrogen at an amount, determined by X-ray photoelectron spectroscopy, that is in a range of about 0.3 atomic % to about 1.8 atomic % of the activated carbon particles, wherein at least some of the nitrogen atoms are substituted for carbon atoms in the crystal lattice structure of the G-band carbon sp$^2$ hybridized graphitic phase; and
(c) mesopores with diameters in a range of 2 nm to 5 nm and micropores with diameters less than 2 nm, the activated carbon particles having:
(i) an average pore width, determined by the Barrett, Joyner, and Halenda (BJH) method, in a range of about 1 nm to about 4 nm;
(ii) a microporous surface area, determined by the t-plot method, in a range of about 300 m$^2$/g to about 1,350 m$^2$/g; and
(ii) a cumulative surface area of micropores with a hydraulic radius in a range of 0.285 nm to 1.30 nm that is in a range of about 1,000 m$^2$/g to about 3,000 m$^2$/g.

2. The activated carbon powder of claim 1, wherein:
the BET surface area of the activated carbon particles is in a range of about 1,300 m$^2$/g to about 2,200 m$^2$/g;
the $I_G/I_D$ ratio is in a range of about 0 to about 1.5;
the amount of nitrogen is in a range of about 0.5 atomic % to about 1.7 atomic % of the activated carbon particles;
the microporous surface area, determined by the t-plot method, is in a range of about 600 m$^2$/g to about 1,200 m$^2$/g; and
the cumulative surface area of micropores with a hydraulic radius in a range of 0.285 nm to 1.30 nm is in a range of about 1,400 m$^2$/g to about 2,600 m$^2$/g.

3. The activated carbon powder of claim 1, wherein the average pore width, determined by the BJH method, is in a range of about 2 nm to about 4 nm.

4. The activated carbon powder of claim 1, wherein the average pore width, determined by the BJH method, is in a range of about 1 nm to about 2 nm.

5. The activated carbon powder of claim 1, wherein the activated carbon particles have a specific capacitance ($C_{sp}$), at a current density of 1 A/g, that is in a range of about 130 F/g to about 330 F/g.

6. The activated carbon powder of claim 1, wherein the activated carbon particles have a specific capacitance, at a current density of 1 A/g, that is in a range of about 100 F/g to about 250 F/g.

7. A process for producing activated carbon particles of an activated carbon powder, the process comprising:
conducting an activation-pyrolyzation treatment of a precursor that comprises a uncarbonized plant material powder, a partially carbonized plant material powder, or a combination thereof, wherein the activation-pyrolyzation treatment comprises:
mixing the precursor with an activating agent to form a precursor-activating agent mixture, wherein the activating agent is selected to react with carbon in the precursor during the activation-pyrolyzation treatment thereby forming one or more products that are suitable to be removed during a washing treatment conducted after the activation-pyrolyzation treatment; and combinations thereof; and
heating the precursor-activating agent mixture in a pyrolyzation inert atmosphere at a pyrolyzation temperature and for a pyrolyzation duration sufficient to complete the carbonization of the precursor thereby forming an activated-pyrolyzed material; and
conducting a washing treatment of the activated-pyrolyzed material with one or more washing liquids suitable to reduce or remove the one or more products of the reaction between carbon and the activating agent from the activated-pyrolyzed material thereby forming the activated carbon particles of the activated carbon powder, wherein the activated carbon particles have a Brunauer-Emmett-Teller (BET) surface area that is in a range of about 900 m$^2$/g to about 2,500 m$^2$/g, and wherein the activated carbon particles comprise:
(a) carbon that comprises:
(i) D-band carbon corresponding to a sp$^3$ hybridized disordered carbon phase; and
(ii) G-band carbon corresponding to a sp$^2$ hybridized graphitic phase;
wherein the D-band carbon and G-band carbon are at a proportion, determined using Raman spectroscopy to arrive at relative intensities of D-band carbon ($I_D$) and G-band carbon ($I_G$), such that a $I_G/I_D$ ratio is in a range of 0 to about 2;
(b) nitrogen at an amount, determined by X-ray photoelectron spectroscopy, that is in a range of about 0.3 atomic % to about 1.8 atomic % of the activated carbon particles, wherein at least some of the nitrogen atoms are substituted for carbon atoms in the crystal lattice structure of the G-band carbon sp$^2$ hybridized graphitic phase; and
(c) mesopores with diameters in a range of 2 nm to 5 nm and micropores with diameters less than 2 nm, the activated carbon particles having:
(i) an average pore width, determined by the Barrett, Joyner, and Halenda (BJH) method, in a range of about 1 nm to about 4 nm;
(ii) a microporous surface area, determined by the t-plot method, in a range of about 300 m$^2$/g to about 1,350 m$^2$/g; and
(iii) a cumulative surface area of micropores with a hydraulic radius in a range of 0.285 nm to 1.30 nm that is in a range of about 1,000 m$^2$/g to about 3,000 m$^2$/g.

8. The process of claim 7 further comprising:
conducting a thermal pretreatment before the activation-pyrolyzation treatment, wherein the thermal pretreatment comprises heating the uncarbonized plant material powder in a pretreatment inert atmosphere at a pretreatment temperature and for a pretreatment duration sufficient to release volatile, low-stability molecules within the uncarbonized plant material powder thereby producing a partially carbonized plant material powder suitable for the activation-pyrolyzation treatment.

9. The process of claim 7, wherein the precursor consists of the uncarbonized plant material powder or the partially carbonized plant material powder.

10. The process of claim 7, wherein:
the activating agent is selected from the group consisting of KOH, NaOH, ZnCl$_2$, H$_3$PO$_4$, steam, and combinations thereof; and
the plant material powder is derived from non-grain soybean plant parts, orange peels, banana peels, tea leaves, corn stover, and combinations thereof.

11. The process of claim 7, wherein the activating agent is KOH, and the precursor and the activating agent are at a mass ratio that is in a range of about 1:0.5 to about 1:3.

12. The process of claim 7, wherein at least one of the washing liquids of the washing treatment is a solution comprising HCl solution and deionized water and wherein a subsequent washing liquid is deionized water.

13. The process of claim 7, wherein:
the pretreatment inert atmosphere is selected from the group consisting of nitrogen, argon, and combinations thereof;
the pretreatment temperature is in a range of about 250° C. to about 500° C.; and
the pretreatment duration is in a range of about 1 hour to about 2 hours.

14. The process of claim 7, wherein:
the precursor and activating agent are at a mass ratio in a range of about 1:0.5 to 1:3;
the pyrolyzation atmosphere is selected from the group consisting of nitrogen, argon, and combinations thereof;
the pyrolyzation temperature is in a range of about 600° C. to about 900° C.; and
the pyrolyzation duration is in a range of about 1 hour to about 2 hours.

15. The process of claim 7, wherein:
the precursor and activating agent are at a mass ratio in a range of about 1:0.125 to 1:1;
the pyrolyzation atmosphere is selected from the group consisting of nitrogen, argon, and combinations thereof;
the pyrolyzation temperature is in a range of about 700° C. to about 850° C.; and
the pyrolyzation duration is in a range of about 1 hour to about 2 hours.

16. The process of claim 7, wherein the plant material powder is derived from non-grain soybean plant parts selected from the group consisting of shells, stems, leaves, and combinations thereof.

17. An electrode comprising an activated carbon powder comprising activated carbon particles, wherein the activated carbon particles have a Brunauer-Emmett-Teller (BET) surface area that is in a range of about 900 $m^2/g$ to about 2,500 $m^2/g$, and wherein the activated carbon particles comprise:
(a) carbon that comprises:
(i) D-band carbon corresponding to a $sp^3$ hybridized disordered carbon phase; and
(ii) G-band carbon corresponding to a $sp^2$ hybridized graphitic phase;
wherein the D-band carbon and G-band carbon are at a proportion, determined using Raman spectroscopy to arrive at relative intensities of D-band carbon ($I_D$) and G-band carbon ($I_G$), such that a $I_G/I_D$ ratio is in a range of 0 to about 2;
(b) nitrogen at an amount, determined by X-ray photoelectron spectroscopy, that is in a range of about 0.3 atomic % to about 1.8 atomic % of the activated carbon particles, wherein at least some of the nitrogen atoms are substituted for carbon atoms in the crystal lattice structure of the G-band carbon $sp^2$ hybridized graphitic phase; and
(c) mesopores with diameters in a range of 2 nm to 5 nm and micropores with diameters less than 2 nm, the activated carbon particles having:
(i) an average pore width, determined by the Barrett, Joyner, and Halenda (BJH) method, in a range of about 1 nm to about 4 nm;
(ii) a microporous surface area, determined by the t-plot method, in a range of about 300 $m^2/g$ to about 1,350 $m^2/g$; and
(ii) a cumulative surface area of micropores with a hydraulic radius in a range of 0.285 nm to 1.30 nm that is in a range of about 1,000 $m^2/g$ to about 3,000 $m^2/g$.

18. A battery or supercapacitor comprising an electrode comprising an activated carbon powder comprising activated carbon particles, wherein the activated carbon particles have a Brunauer-Emmett-Teller (BET) surface area that is in a range of about 900 $m^2/g$ to about 2,500 $m^2/g$, and wherein the activated carbon particles comprise:
(a) carbon that comprises:
(i) D-band carbon corresponding to a $sp^3$ hybridized disordered carbon phase; and
(ii) G-band carbon corresponding to a $sp^2$ hybridized graphitic phase;
wherein the D-band carbon and G-band carbon are at a proportion, determined using Raman spectroscopy to arrive at relative intensities of D-band carbon ($I_D$) and G-band carbon ($I_G$), such that a $I_G/I_D$ ratio is in a range of 0 to about 2;
(b) nitrogen at an amount, determined by X-ray photoelectron spectroscopy, that is in a range of about 0.3 atomic % to about 1.8 atomic % of the activated carbon particles, wherein at least some of the nitrogen atoms are substituted for carbon atoms in the crystal lattice structure of the G-band carbon $sp^2$ hybridized graphitic phase; and
(c) mesopores with diameters in a range of 2 nm to 5 nm and micropores with diameters less than 2 nm, the activated carbon particles having:
(i) an average pore width, determined by the Barrett, Joyner, and Halenda (BJH) method, in a range of about 1 nm to about 4 nm;
(ii) a microporous surface area, determined by the t-plot method, in a range of about 300 $m^2/g$ to about 1,350 $m^2/g$; and
(ii) a cumulative surface area of micropores with a hydraulic radius in a range of 0.285 nm to 1.30 nm that is in a range of about 1,000 $m^2/g$ to about 3,000 $m^2/g$.

* * * * *